United States Patent
Jayasimha et al.

(10) Patent No.: US 8,514,889 B2
(45) Date of Patent: Aug. 20, 2013

(54) USE OF COMMON DATA FORMAT TO FACILITATE LINK WIDTH CONVERSION IN A ROUTER WITH FLEXIBLE LINK WIDTHS

(75) Inventors: Doddaballapur N. Jayasimha, Sunnyvale, CA (US); Jeremy Chan, San Jose, CA (US); Jay S. Tomlinson, San Jose, CA (US)

(73) Assignee: Sonics, Inc., Milpitas, CA (US)

( * ) Notice: Subject to any disclaimer, the term of this patent is extended or adjusted under 35 U.S.C. 154(b) by 178 days.

(21) Appl. No.: 13/219,496

(22) Filed: Aug. 26, 2011

(65) Prior Publication Data
US 2013/0051391 A1 Feb. 28, 2013

(51) Int. Cl.
*H04J 3/24* (2006.01)
*H04L 12/56* (2011.01)

(52) U.S. Cl.
USPC ............................ 370/474; 370/392; 370/428

(58) Field of Classification Search
None
See application file for complete search history.

(56) References Cited

U.S. PATENT DOCUMENTS

| | | | |
|---|---|---|---|
| 5,948,089 A | 9/1999 | Wingard et al. | |
| 6,182,183 B1 | 1/2001 | Wingard et al. | |
| 6,310,884 B1* | 10/2001 | Odenwald, Jr. | 370/412 |
| 6,725,313 B1 | 4/2004 | Wingard et al. | |
| 6,785,753 B2 | 8/2004 | Weber et al. | |
| 7,475,168 B2 | 1/2009 | Weber et al. | |
| 7,574,629 B2 | 8/2009 | Douady | |
| 7,769,027 B2 | 8/2010 | Douady | |
| 8,032,676 B2 | 10/2011 | Wingard et al. | |
| 8,311,040 B2* | 11/2012 | Stanwood et al. | 370/389 |
| 8,316,171 B2 | 11/2012 | Boucard | |
| 8,407,433 B2 | 3/2013 | Wingard et al. | |
| 2003/0039250 A1* | 2/2003 | Nichols et al. | 370/394 |
| 2004/0190548 A1* | 9/2004 | Harel et al. | 370/466 |
| 2005/0210164 A1 | 9/2005 | Weber et al. | |
| 2005/0216641 A1 | 9/2005 | Weber et al. | |
| 2005/0276223 A1* | 12/2005 | Maggi et al. | 370/235 |
| 2006/0095635 A1 | 5/2006 | Vinogradov et al. | |
| 2006/0187907 A1* | 8/2006 | Kinsman et al. | 370/360 |
| 2008/0285562 A1* | 11/2008 | Scott et al. | 370/392 |
| 2009/0092076 A1* | 4/2009 | Zheng et al. | 370/328 |
| 2010/0135287 A1* | 6/2010 | Hosain et al. | 370/389 |
| 2012/0063395 A1* | 3/2012 | Ho | 370/329 |
| 2013/0002315 A1 | 1/2013 | Boucard | |
| 2013/0009695 A1 | 1/2013 | Boucard | |

* cited by examiner

*Primary Examiner* — Ian N Moore
*Assistant Examiner* — Eric P Smith
(74) *Attorney, Agent, or Firm* — Rutan & Tucker, LLP

(57) ABSTRACT

A method for routing information in a flexible routing network which connects disparate initiators and targets includes implementing a packetization logic at an interface between an initiator or a target and a routing network to receive transmission traffic from the initiator or the target and to packetize the transmission traffic into packets. Each packet includes header and body portions. Each of the header and body portions includes one or more standard sized transmission units. Each standard sized transmission unit includes control and payload sections. A payload section associated with the body portion includes one or more chunks. The method includes encoding the one or more chunks using a Common Data Format (CDF). All transmissions within the routing network are based on the CDF. The CDF facilitates narrow-to-wide and wide-to-narrow link width conversion without having to manipulate subparts of data fields in the transmission traffic.

20 Claims, 18 Drawing Sheets

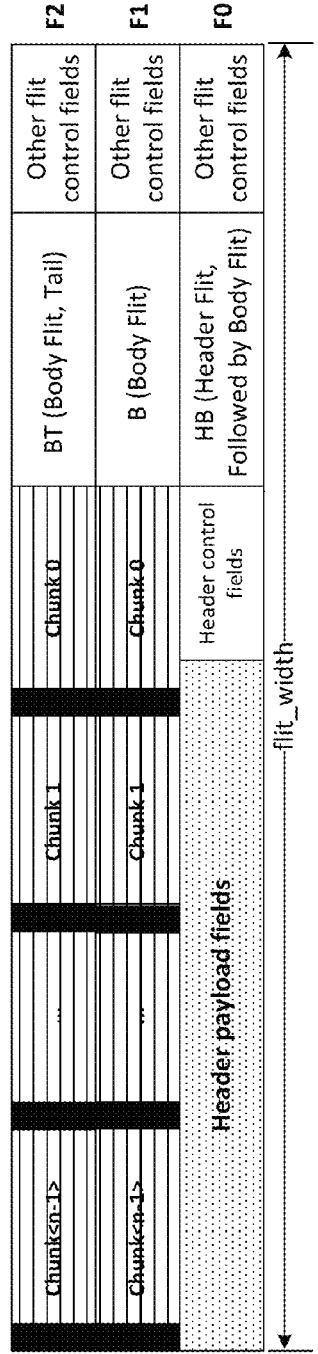
FIG. 9A – 3-Flit Packet
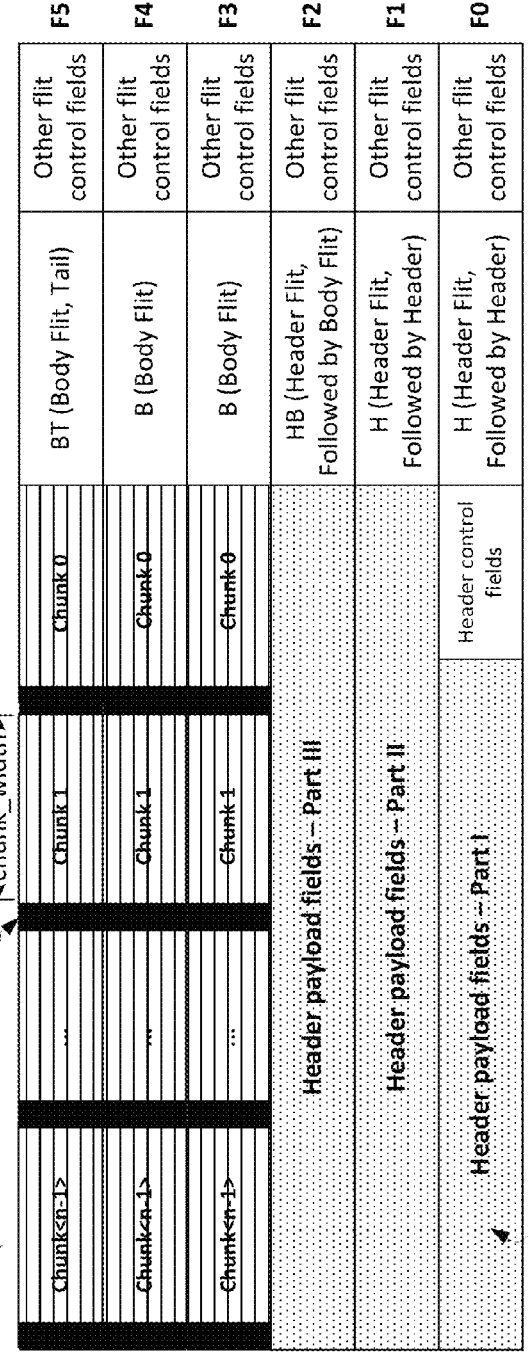
FIG. 9B – 6-Flit Packet (Narrow to Wide)

(Wide to Narrow)

USE OF COMMON DATA FORMAT TO FACILITATE LINK WIDTH CONVERSION IN A ROUTER WITH FLEXIBLE LINK WIDTHS

NOTICE OF COPYRIGHT

A portion of the disclosure of this patent document contains material that is subject to copyright protection. The copyright owner has no objection to the facsimile reproduction by anyone as long as it appears in the Patent and Trademark Office Patent file or records, but otherwise reserves all copyright rights whatsoever.

FIELD

Embodiments of the present invention generally relate to the field of data routing, and, in some embodiments, specifically relate to using a common data format (CDF) to route information in a routing network.

BACKGROUND

In a System on a Chip (SoC) environment, many Initiator Intellectual Property cores (IC) and Target Intellectual Property cores (TC) with different capabilities are connected through a network. The differences in the capabilities often require many overheads in timing and space to enable the communication between the ICs and the TCs to occur.

SUMMARY

Some embodiments of the invention may include a flexible routing network for a Network on a Chip (NoC) architecture which connects disparate initiators and targets. The flexible network includes multiple routers to enable a first transmitting traffic from the initiators to the targets for request networks and from the targets to the initiators for response networks. The initiators are associated with initiator agents (IA). The targets are associated with target agents (TA). Packetization logic located at an interface between an initiator or a target and the routing network is configured to receive the first transmission traffic from the initiator or the target and packetize the first transmission traffic into packets. Each packet includes a header portion and a body portion, wherein each of the header portion and the body portion includes one or more standard sized transmission units. Each standard sized transmission unit includes a control section and a payload section. A payload section associated with the body portion includes one or more chunks formatted according to a common data format (CDF) each including a first mandatory field followed by zero or more mandatory fields and multiple optional fields. Each of the fields may have differing widths, and in this manner, width conversion may occur in the network and building a simple and timing friendly network-on-chip may be achieved. The first mandatory field may be aligned with a first set of least significant bits (LSB) of the chunk. The multiple optional fields may be arranged according to frequency of use with a most frequently used optional field placed immediately next to and starting at a higher significant bit position from the first mandatory field and a least frequently used optional field placed furthest away from the first mandatory field. All data transmissions within the routing network are based on the CDF. The packetization logic is configured to encode the first transmission traffic into the one or more chunks formatted according to the CDF. Using CDF for the data transmission in the network may help in the simpler verification of network components such as routers.

BRIEF DESCRIPTION OF THE DRAWINGS

The multiple drawings refer to the embodiments of the invention.

FIGS. 9A-9B illustrate example embodiments of a structure of a flit relative to the data chunk and the header chunk.

Figure 1A:
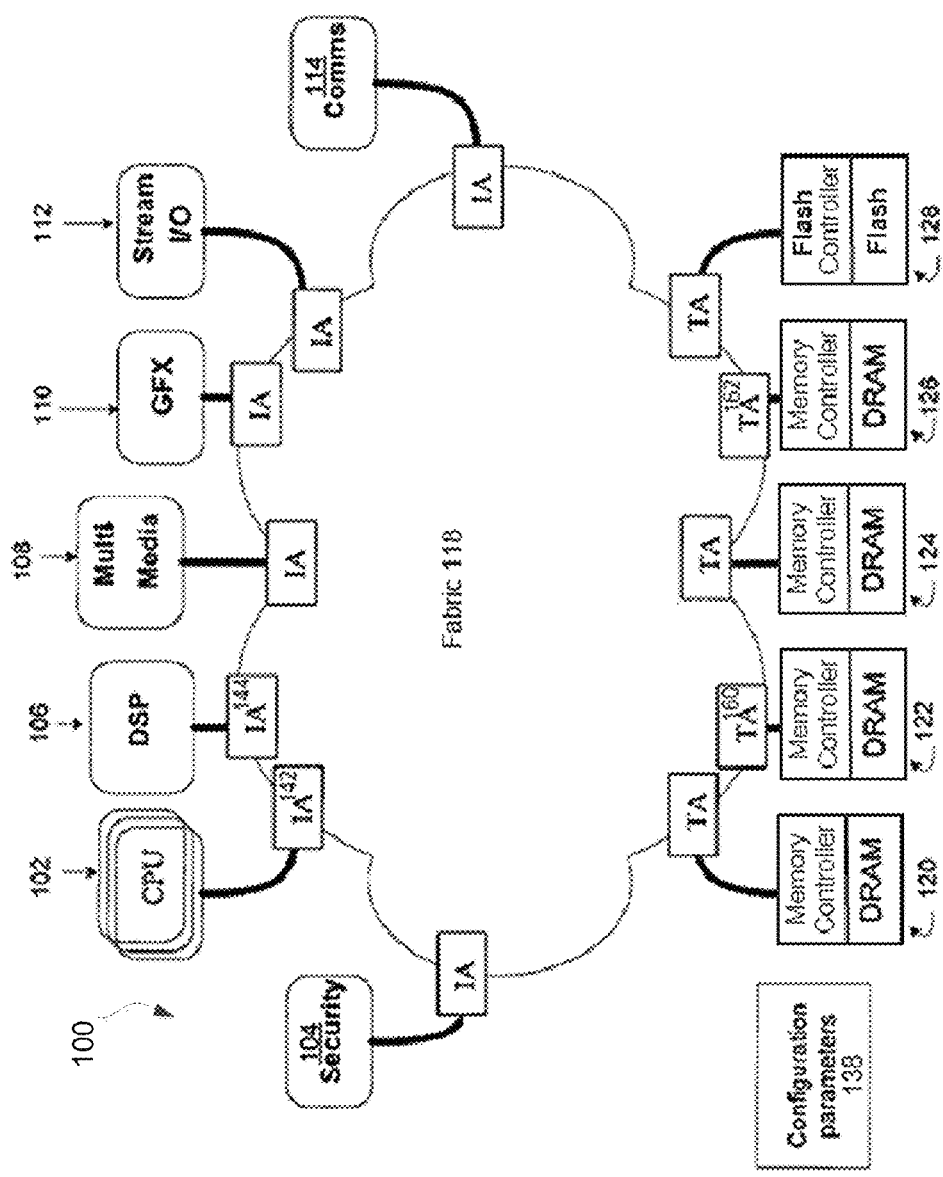
FIG. 1A illustrates a block diagram of an embodiment of a System-on-a-Chip (SoC).

While the invention is subject to various modifications and alternative forms, specific embodiments thereof have been shown by way of example in the drawings and will herein be described in detail. The invention should be understood not to be limited to the particular forms disclosed, but, on the contrary, to cover all modifications, equivalents, and alternatives falling within the spirit and scope of the invention.

DETAILED DISCUSSION

In the following description, numerous specific details are set forth, such as examples of named components, connections, types of circuits, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Further specific numeric references (e.g., a first router, a second router, etc.) may be made. However, the specific numeric reference should not be interpreted as a literal sequential order but rather interpreted that the first array is different from a second array. Thus, the specific details set forth are merely exemplary. The specific details may vary from and still be contemplated to be within the spirit and scope of the present invention.

Various methods and apparatus associated with routing information from ICs to TCs through one or more routers in a System on a Chip (SoC) interconnect that takes into consideration the disparate nature and configurability of the ICs and TCs are disclosed. The methods and apparatus enable efficient transmission of information through the interconnect using a common data format (CDF) chunk based on the identification of a base data word (BDW) for an orthogonal group (also referred to as a set of connected agents). Alignment based on the least significant bit (LSB) is used. Padding may be used to fill possible gaps. Schemes for efficient and fast width conversion are performed at each router. An arbitrary number of width conversions are permitted in the traversal of a packet from the source to the destination. An end-to-end view is maintained through appropriate encodings by a packetizer and decodings by a depacketizer.

For some embodiments, a computer-readable media that stores instructions, which when executed by a machine, cause the machine to perform operations comprising implementing a packetization logic at an interface between an initiator or a target and a routing network to receive a first transmission traffic from the initiator or the target and to packetize the first transmission traffic into packets. The routing network includes multiple routers to enable the first transmitting traffic from the initiators to the targets for request networks and from the targets to the initiators for response networks. The initiators are associated with initiator agents (IA), and the targets are associated with target agents (TA). Each packet includes a header portion and a body portion. Each of the header portion and the body portion includes one or more standard sized transmission units. Each standard sized transmission unit includes a control section and a payload section, wherein a payload section associated with the body portion includes one or more chunks. The computer-readable media may also store instructions that cause a machine to perform operations that encodes the one or more chunks using a common data format (CDF), the CDF including a first mandatory field followed by zero or more mandatory fields and multiple optional fields. The first mandatory field is aligned with a first set of least significant bits (LSB) of the chunk. The multiple optional fields are arranged according to frequency of use with a most frequently used optional field placed immediately next to and starting at a higher significant bit position from the last mandatory field and a least frequently used optional field placed furthest away from the first mandatory field. Without loss of generality, it is assumed in the rest of this document that there is a single mandatory field. An optional field is not transmitted in the routing network when that optional field is not required by an initiator or a target associated with an identified set of connected IAs and TAs. For some embodiments, when a first optional field is present in the chunk, all optional fields more frequently used than the first optional field are also present in the chunk. This may make the router design simpler. All transmissions within the routing network are based on the CDF. The computer-readable media may also store instructions that cause a machine to perform operations that implementing depacketization logic at the interface between the initiator or the target and the routing network to receive the packets having the chunks formatted according to the CDF and to decode the chunks into a second transmission traffic associated with the targets for the request networks or associated with the initiators for the response networks. The CDF facilitates narrow-to-wide and wide-to-narrow link width conversion so that it may not be necessary to manipulate subparts of the data fields in the first transmission traffic. The narrow-to-wide link width conversion is facilitated by placing two or more chunks adjacent to each other and wherein the wide-to-narrow link width conversion is facilitated by separating a wide chunk into two or more narrower chunks.

Overview

In general, in an interconnection network, there are a number of heterogeneous initiator agents (IAs) and target agents (TAs) and routers. As the packets travel from the IAs to the TAs in a request network, their width may be adjusted by operations referred to as link width conversion. The operations may examine individual subfields which may cause timing delay and may require complex logic. By using a common data format (CDF), the link width conversion operations can be done efficiently and relatively simply at a width converting element (e.g., router). Embodiments of the invention provide methods to perform flexible width conversion in packet based System on Chip (SoC) interconnects. The interconnect may include multiple routers. The packets transmitted between the routers may be broken into flits. CDF data chunks are defined based on a base data word for an orthogonal group. Depending on the width of an intervening link (based on functional, area, wiring considerations), each flit has a number of such chunks. Schemes for efficient and fast width conversion at each width converting element (typically a router) are based on the appropriate regrouping of the CDF chunks and the update of flit control fields. The routers assist in chunk steering. Flits are reformatted by routers to allow simple depacketization of unaligned initiator bursts. Even though an arbitrary number of width conversions are permitted in the traversal of a packet from the source to the destination, a relatively simple end-to-end view is maintained through appropriate encodings at the fabric interface packetizer (FIP) and decodings at the fabric interface depacketizer (FID).

IP Cores and Fabric

FIG. 1A illustrates a block diagram of an embodiment of a System on a Chip (SoC). Diagram 100 includes multiple initiator IP cores (ICs) and multiple target IP cores (TCs) that communicate read and write requests as well as responses to those requests over a network or fabric 118. The fabric 118 may also be referred to as a packet-based switch network because the data transferred within the fabric is in the forms of packets. Some examples of an IC may include a CPU IP core 102, an on-chip security IP core 104, a digital signal processor (DSP) IP core 106, a multimedia IP core 108, a graphics IP core 110, a streaming input-output (I/O) IP core 112, a communications IP core 114 (e.g., a wireless transmit and receive IP core with devices or components external to the chip, etc.), etc.

Each IC may have its own initiator agent (IA) (e.g., IA 142, IA 144, etc.) to interface with the fabric 118. Some examples of a TC may include DRAM IP core 120 through DRAM IP core 126 and FLASH memory IP core 128. Each TC may have its own target agent (TA) (e.g., TA 160, TA 162) to interface with the fabric 118. Each of the DRAM IP cores 120-126 may have an associated memory controller. Similarly, the flash memory 128 is associated with a flash controller. All of the ICs 102-114 and TCs 120-128 may operate at different performance rates (i.e. peak bandwidth, which can be calculated as the clock frequency times the number of data bit lines (also known as data width), and sustained bandwidth, which represents a required or intended performance level). The fabric 118 may be part of an integrated circuit, such as System on a Chip (SoC).

Routing Network

Figure 1B:
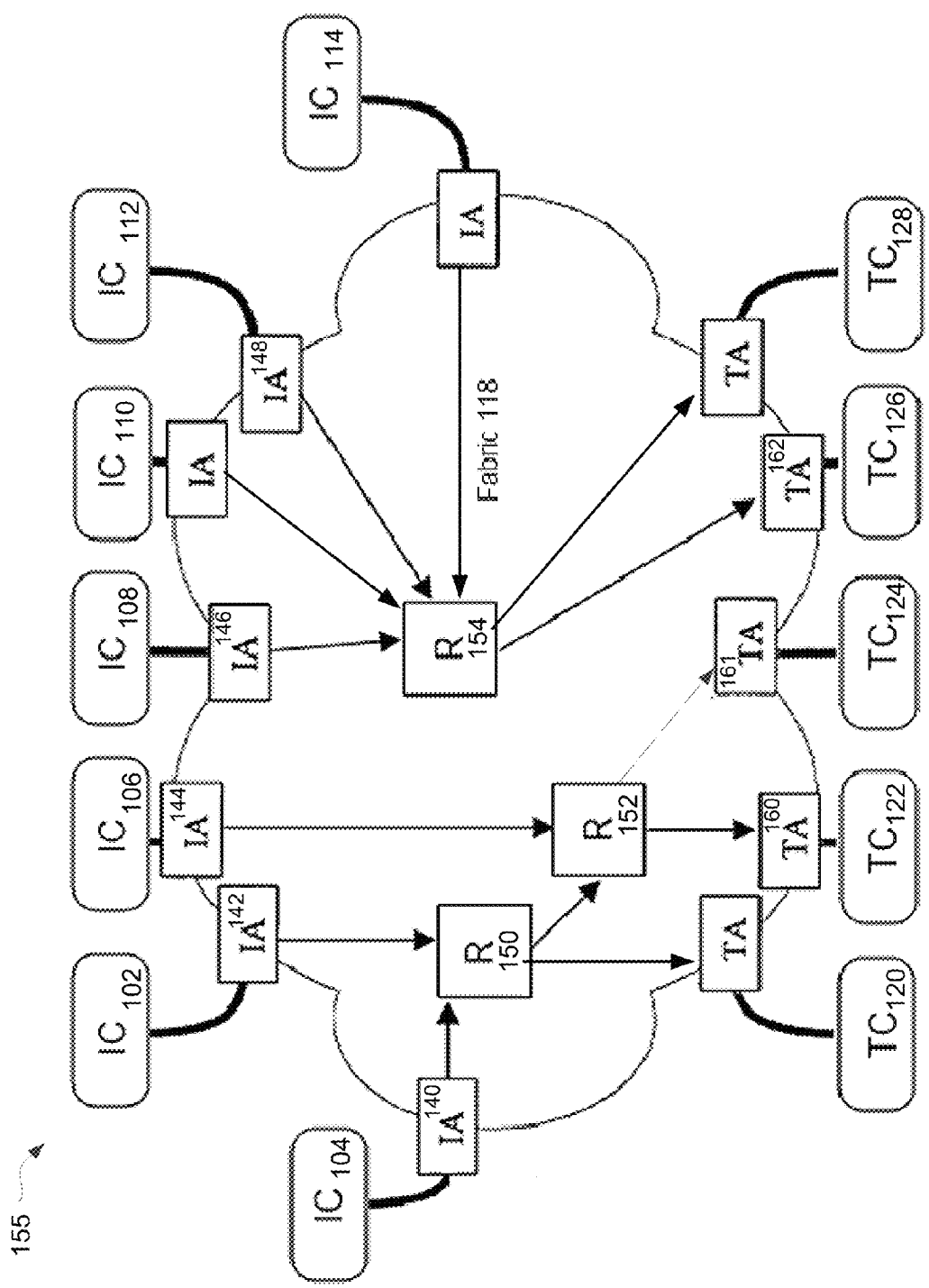
FIG. 1B illustrates a block diagram of an embodiment of a fabric.

FIG. 1B illustrates a block diagram of an embodiment of a fabric. Diagram 155 is similar to the diagram 100 but with the addition of the routers in the fabric 118. The diagram 155 illustrates a request network where the information flows from the ICs and IAs to the TAs and TCs. Although not illustrated, there is a corresponding response network that connect the TCs and the TAs to the IAs and ICs. The routers may be used to route packets within the fabric 118 from a source location (e.g., the ICs 102-114) to a destination location (e.g., the TCs 120-128) in the integrated circuit. There may be multiple routers in the fabric 118. The number of routers may be implementation specific (e.g., topology used, area requirement, latency requirement, etc.). The data sent from the IC 102 to the TC 122 may be packetized by packetizing logic associated with the IA 142 before being sent into the fabric 118. The packets may pass through the routers 150 and 152. The packets may then be depacketized by depacketizing logic associated with the TA 160 when they leave the fabric 118. Similarly, the data sent from the IC 108 to the TC 126 may be packetized by packetizing logic associated with the IA 146 before being sent into the fabric 118. The packets may pass through the router 154. The packets may then be depacketized by depacketizing logic associated with the TA 162 when they leave the fabric 118. Also illustrated in FIG. 1B are the data flowing from the router 152 to the TA 161 of the TC 124, and the data flowing from the IC 112 to the IA 148 and the router 154.

The packets may be broken into small pieces called flits (or flow control units) when they are sent between two routers or between an IA and a router or between a router and a TA. A flit may be referred to as a standard sized transmission unit. A flit may take several cycles to transfer. A smallest physical unit of information at the physical layer that is transferred across one physical link in one cycle is called a phit. A flit can consist of one or more phits. The router implements routing and flow control functions required to buffer the incoming flits and forward them to their intended destinations. The router is pipelined at the flit level, and its architecture follows a virtual channel (VC) router and is configured for Network-on-Chip (NoC) applications. The router may include multiple links that are used in a shared fashion as virtual channels. Each VC is associated with a VC identification number (VC ID) and may hold the state needed to coordinate the handling of the flits of a packet over a channel. This state may identify the output channel of the current router for the next hop of the route and the state of the virtual channel (idle, waiting for resources, or active). The VC may also include pointers to the flits of the packet that are buffered on the current router and the number of flit buffers available on the next router.

Figure 1C:
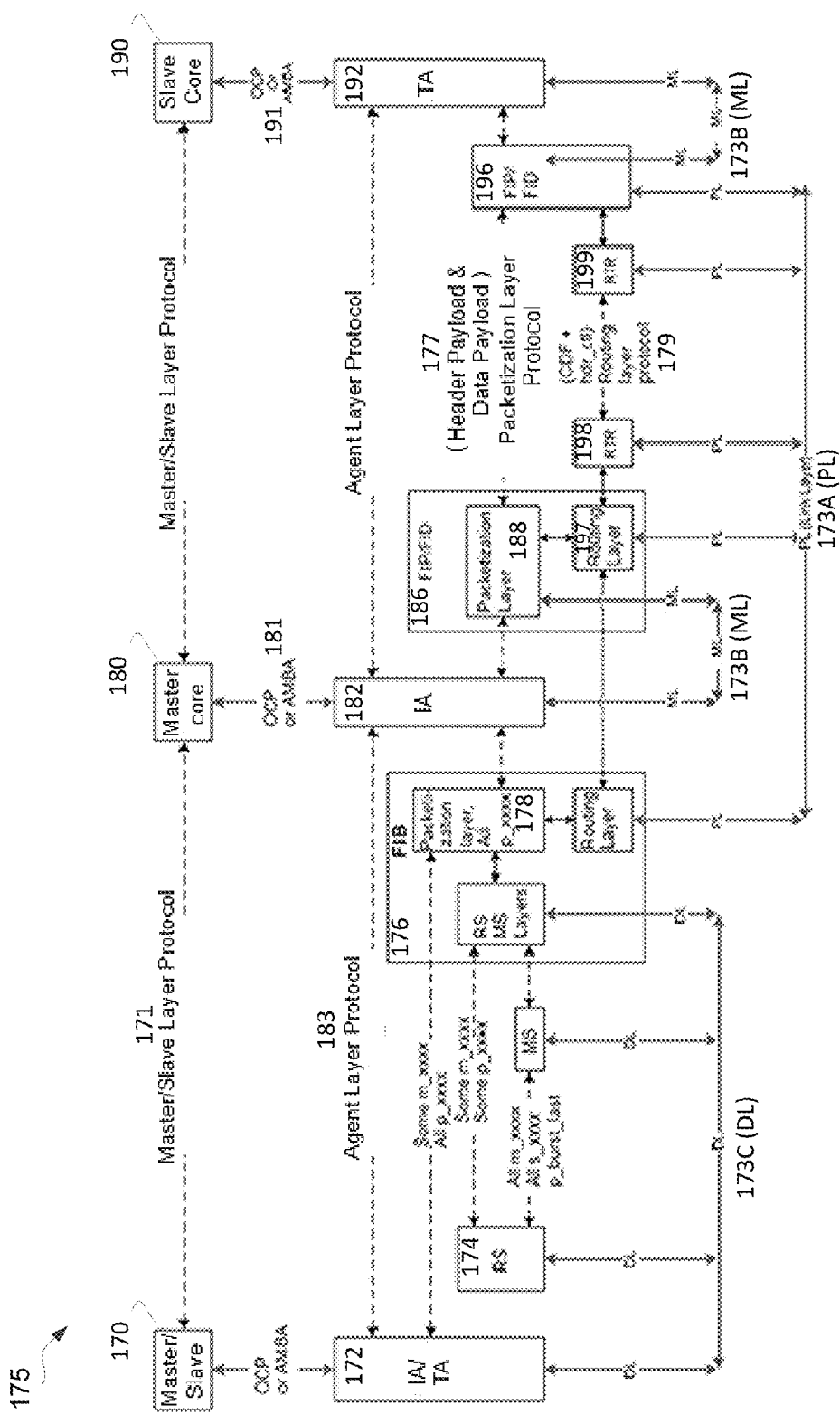
FIG. 1C illustrates a block diagram of an embodiment of interfaces and protocol layers and packetized protocol layers used by components of a network.

FIG. 1C illustrates a block diagram of an embodiment of interfaces and protocol layers and packetized protocol layers used by components of a network. Diagram 175 includes master cores 170, 180 and a slave core 190. Each of the master cores 170, 180 and the slave core 190 may correspond to the IC or TC illustrated in FIGS. 1A and 1B. The diagram 175 also includes fabric interface logic 186 and 196, each of which may include packetization and depacketization logic. Requests from the master core 180, such as command to get data from memory, are expressed in a standard interface protocol such as Open Core Protocol (OCP) or the Advanced Microcontroller Bus Architecture (AMBA) protocol or using a proprietary interface protocol. The requests are then received by the IA 182.

The request may then be packetized by the fabric interface logic 186, and the packets are sent into the fabric 118. The packets may be routed by the routers 198 and 199 as flits before arriving at the fabric interface 196. The fabric interface 196 then depacketizes the packets into messages and then sends the message to the TA 192. The TA 192 then sends the messages to the slave core 190 using the OCP or AMBA or any socket protocol 191. Each of the routers 198 and 199 may be configured to perform some link width conversion such that an accumulated link width conversion by all of the routers will ensure that the packets arriving at the fabric interface 196 will be as expected by the fabric interface 196. The link width conversion module 280 (shown in FIG. 2) may perform the conversion operations. When there is a response message by the slave core 190, the response message is transmitted to the TA 192 and then packetized by the fabric interface 196. The routers 198 and 199 may again perform the link width conversion such that when the packets associated with the response message arrive at the switch interface 186, they will match with what is expected by the fabric interface 186.

The double-arrowed solid lines in FIG. 1C represent physical links connecting the components of the flexible network. The horizontal double-arrowed dotted lines drawn between the components indicate that a special type of layer protocol is used between those components that may or may not be connected to one another via any physical link. For example, at the packetization layer 188, a packetization layer protocol 177 is used for communication. The packetization layer 188 is responsible for packetization/depacketization, reformatting the data into a common data format (CDF) and vice versa. The functionality of the packetization layer 188 may exist in the fabric interface packetizer (FIP) and the fabric interface depacketizer (FID). The FIP and FID are responsible for facilitating packing and/or unpacking the external socket transactions on the request network and on the response network.

At the routing layer 197, a routing layer protocol 179 is used for communication between the routers. The routing layer 197 is responsible for handling routing and width conversion related functionality. As shown in FIG. 1C, the functionality of the routing layer 197 may exist in the routers and in the FIP and FID. The RS 174 is responsible for data transfer of the flits between adjacent routers for flow control and for virtual channel management. A layer protocol 183 is also used for communications between an IA request side and a TA request side, and between a TA response side and an IA response side. Communication among the components illustrated on the bottom of FIG. 1C is based on message links (MLs) 173B, packet links (PLs) 173A, etc. For example, the ML 173B is used to connect the IA 182 with the fabric interface 186; the PL 173A is the interface that connects the fabric interface 186 with the router 198, and the router 199 with the fabric interface 186. It is packet based.

The message link (ML) is the interface between initiator agents (IA) and the fabric interface packetizer (FIP) or fabric interface depacketizer (FID), and between the target agent (TA) and its associated FID or FIP. The ML protocol is a synchronous point-to-point unidirectional protocol with a master and a slave. It defines the interface bundles internal to the agents. The ML is used to capture the socket information from the socket interface protocols such as OCP or AMBA AXI. The ML is used as the agent internal interface protocol at the interface between the agents (IA or TA) and the packetization logic or the depacketization logic.

Figure 2:
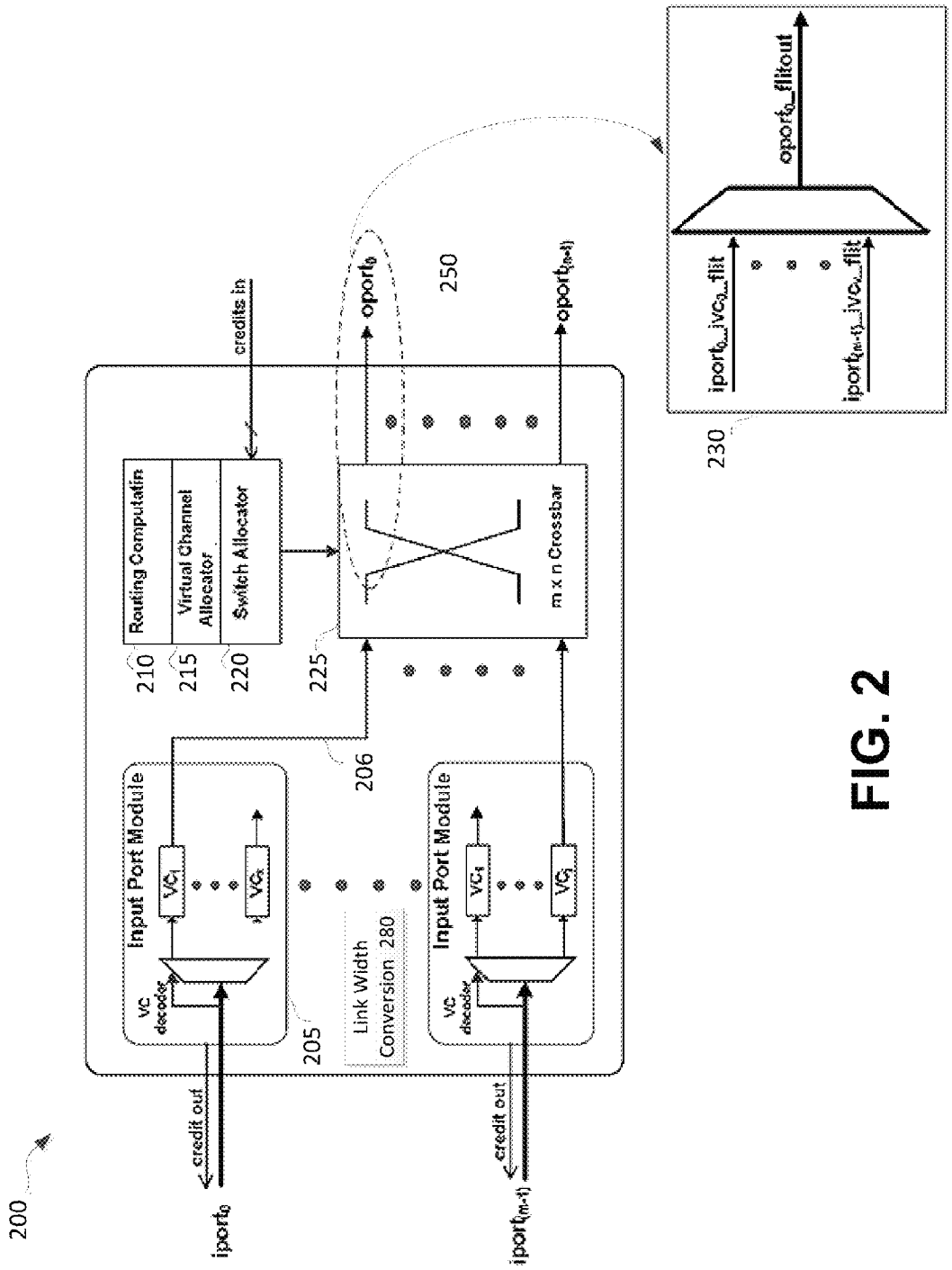
FIG. 2 illustrates some components of an embodiment of a router.

FIG. 2 illustrates some components of an embodiment of a router. Router 200 may be composed of decision-making modules, which govern the shared resources. The decision-making modules may include the input-buffering module 205, the route-computing module 210, the virtual channel allocation module 215, the switch allocation module 220, and the flow control module. The shared resources may include the input VC buffer storage, the crossbar switch 225, and the output ports 250. The shared buffer storage is based on each input port and may be implemented as a content addressable memory (CAM). When active, the decision-making modules may coordinate with each other through the states of the input VCs. To advance, a flit may undergo several operations. An incoming header flit needs to go through the operations of buffer write (BW), route computation (RC), virtual channel allocation (VA), switch allocation (SA), switch traversal (ST), and link traversal (LT) before it arrives at the next hop. The body and tail flits of the same packet inherit the outgoing VC from the header flit and may only proceed through operations of BW, SA, ST, and LT. Among those operations, the RC and VA may be considered as packet level procedures and the rest of the operations may be considered as flit-level procedures.

The BW refers to an action of loading the newly arrived flits into the correct input port VC storage. The RC refers to a process of extracting the route information from the header flit of a packet at each fabric network hop. The per hop route information may include an output port ID and an output VC ID. The VA refers to a process of arbitrating among various packets requesting for the same output VC and allocating the requested output VC to the arbitration winner. Only one output VC can be allocated to one packet at any time. The SA refers to a process of arbitrating among the output VCs belonging to the same output port and determining which of the output VCs is to be granted access to an output port. An output port can only be allocated to one output VC at any time. The ST refers to a process in which a flit leaves the VC storage associated with an input VC of an input port and traverses to the output port. The LT refers to a process in which a flit leaves the current hop and propagates along the physical link connecting the fabric network entities (FID, FIP, and router).

The decision-making modules manage both the packet-level procedures and the flit-level procedures. The input port module 205 is configured to load the incoming flits into the intended VC buffer storage. The route computing module 210 is configured to examine the routing field in a header flit of a packet and computes the output port and the output VC through which the packet should be routed.

The packets are routed from the source to the destination using an appropriate deadlock-free routing scheme. The routes may be computed at the source or at each hop. For illustration purposes, a source based routing scheme is assumed; however, it should be noted that embodiments of the invention may also be used with other routing schemes. A designer knows exactly what is wanted for each IP core including the appropriate data width requirement. The designer also has different requirements in getting the packets from one IP core to another IP core, including the paths, the latency, the number of hops, etc. All of the requirements are taken into consideration to derive at the final structure of the fabric so that the designer's requirements are met. The final structure may be a number of routers, and the routers may have similar or different channel width for their input and output ports.

The structure of the fabric is defined in a connectivity table. The definition may be in one of two formats: simplified or detailed. In the simplified format, only the identification of the initiator agent (IA), the fabric interface packetizer (FIP), the fabric interface depacketizer (FID), the routers (RTR), and the target agent (TA) are included. Following is an example of a connectivity table for a request network.

```
connectivity_table {   ia1 fi1 r00 r10 fia taa
                       ia1 fi1 r00 r10 fib tab
                       ia1 fi1 r00 r11 fie tae
                       ia1 fi1 r00 r11 fig tag
                       ia1 fi1 r00 r12 fii tai  }
```

The response network in the simplified format may be created by inverting the structure of the request network. In the detailed format, the designer may specify all aspects of the route from the IA to the TA including the data widths, the input and output interfaces of the routers, the names and connections for the FIs and the routers, and the VCs involved. Each line of the connectivity table specifies the initiator name, initiator thread, the width between the initiator and the FIP, the FIP name, the width between the FIP/RTR and the next RTR/FID, RTR based VC name, input interface number of the RTR, shared memory depth of the VC, RTR name, output interface number of the router (these 6 entries are repeated as often as needed for the RTRs needed to support the route), the width between the RTR and the FID, the FID name, the width between the FID the target and finally the target name. Following is an example of the connectivity table for a request network in the detailed format.

```
connectivity_table
    { ia1 0 64 fiia1 32 VC0 0 −1 r00 0 32 VC0 0 −1 r30 0 32
    fita1 64 ta1 }
```

The above example describes the route between ia1 thread 0 and ta1. The width between the IA and the FIP and between the FID and the TA are 64 bits wide. All the widths between the FIP/RTR and the next RTR/FID are 32 bits. The route goes into plin0 and out of plout0 of both routers r00 and r30. It also enters VC0 of both routers. No shared memory depth is specified (a value other than "−1" specifies a depth).

Referring to FIG. 2, the virtual channel allocation (VA) module 215 is configured to arbitrate among the packets requesting for the same output VC and allocates the output VC to the arbitration winner if and only if the output VC has not been granted to any other input VCs at the time. The switch allocation (SA) module 220 is configured to arbitrate among output VCs belonging to the same output port and determines which output VC is granted to access the output port 250 of the crossbar switch 225. Block 230 illustrates the multiple flits competing for the output port. As mentioned, the source routing allows the designer to specify the output port that the designer wants the packet to pass through. As such, it may be possible that multiple flits try to request for the same output port or resource. This is resolved by arbitration. It may be noted that there are two levels of arbitration. The first arbitration is for multiple input VCs competing for an output VC and performed by the VA module 215. The second arbitration is for multiple output VCs competing for an output port and performed by the SA module 220. The connection 206 illustrates an example connection from the VC buffer storage to an output port associated with the crossbar switch 225.

Upon completion of the switch allocation operations, a flit waiting in the VC storage is granted access to an output port 250 of the crossbar switch 225. That flit may propagate through the crossbar switch 225 and the output port 250 to arrive at the next hop. The process of a flit propagating through the crossbar switch 225 is referred to as switch traversal. The process of a flit propagating along the inter-router physical link is referred to as link traversal.

Common Data Format (CDF)

Figure 3A:
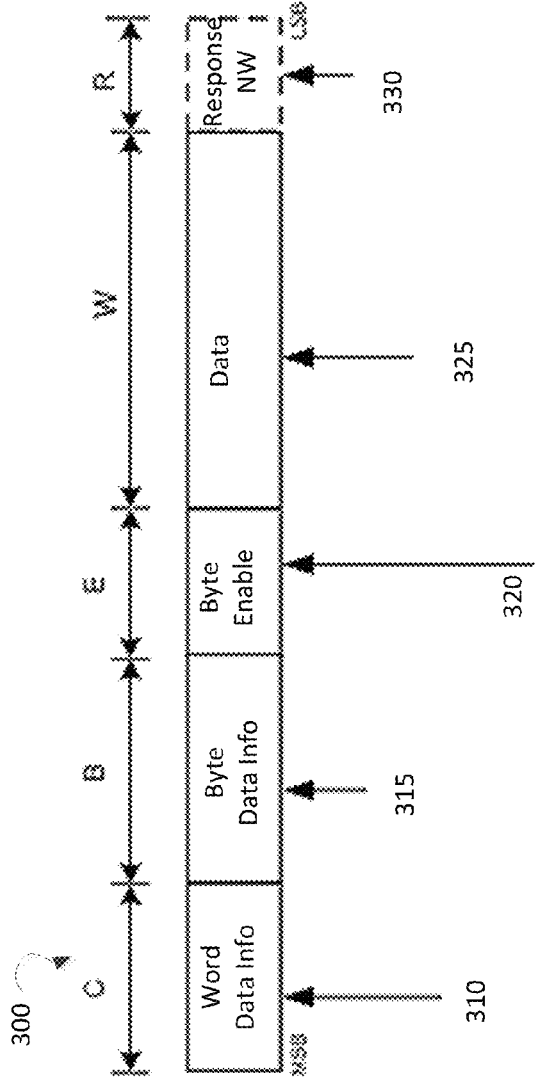
FIG. 3A illustrates an example embodiment of a common data format (CDF) that may be used to describe the data associated with the initiator cores (ICs) and the target cores (TCs).

In typical SoC environment, there are many ICs and TCs, and they all have different requirements. One of the differences is the data width requirement. In addition, there may information that is used to describe the data including, for example, byte enable information, byte data information, word data information, etc. FIG. 3A illustrates an example embodiment of a common data format (CDF) that may be used to describe the data associated with the ICs and the TCs. The CDF 300 includes a base data word field (W) 325, a byte enable field (E) 320, a byte data field (B) 315, and a word data field (C) 310. The field R 330 is applicable only for a response network and is not used for a request network. The least commonly used field is field C 310; next is the field B 315, then field E 320, and then the field W 325. The field W 325 is the most commonly used field.

For some embodiments, all data transmissions within the fabric are based on the CDF 300. A unit of data using the CDF 300 is referred to as a chunk or a CDF chunk. The width of each field in the CDF 300 is fixed and is the same for every TA belonging to a group referred to as an orthogonal group (described below). The SoC may have multiple orthogonal groups. The orthogonal group determines the minimum base data word and its width for the links associated with the orthogonal group. It is assumed that the request and response networks are separate, and the CDFs for the request and response networks are separately derived. In general, the base data word (BDW) is derived from the orthogonal group.

Figure 3B:
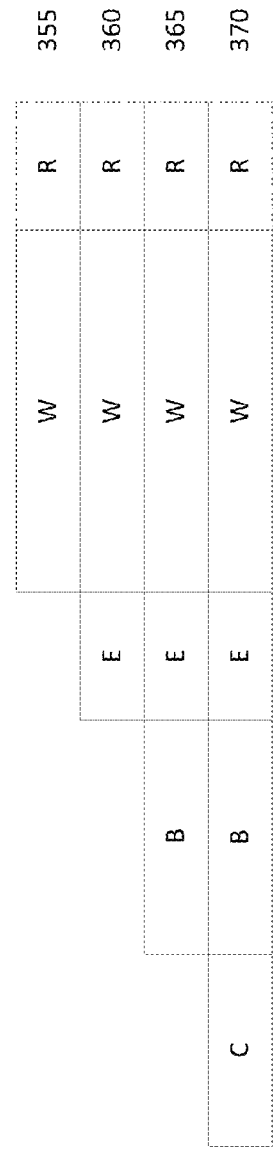
FIG. 3B illustrates an example embodiment of the chunk data.

FIG. 3B illustrates an example embodiment of the chunk data. For a request network, when a link carries the data payload, then the field W 325 is mandatory. All other fields E 320, B 315 and C 310 are optional. Some targets have them while some don't. To make the router design simple, the presence of the other fields in a CDF chunk is determined based on a rule referred to as a postfix rule. Based on this rule, the presence of an optional field such as the field E 320, B 315 or C 310 in a link implies that all of the fields to its right are included in the CDF chunk on that link (except when the fields are not needed in the orthogonal group). For example, if the field C 310 is present (or needed), then the field B 315 and the field E 320 are present in the CDF chunk carried on that link, unless these two fields B 315 and E 320 are not required in the orthogonal group. Similarly, when the field B 315 is present (or needed), then the field E 320 is present in the CDF chunk carried on that link, unless the field E 320 is not required in the orthogonal group.

Referring to FIG. 3B, the data chunk 350 includes just the base data word (the field W 325). The data chunk 350 includes the base data word and the byte enable information (the fields W 325 and E 320). The data chunk 355 includes the base data word, the byte enable information, and the per byte data information (the fields W 325, E 320 and B 315). The chunk 360 includes the base data word, the byte enable information, the per byte data information, and the per word data information (the field W 325, E 320, B 315 and C 310). When the network is a response network, the data chunks 350, 355, 360 and 365 also includes the field R 330. The per byte information field B 315 and the per word information C 310 can be accessed from the initiators or targets depending on the type of network.

For some embodiments, when an IC or TC associated with an orthogonal group does not require a particular field that is used by other cores in the group or in another orthogonal group, then such a field may not need to be transmitted in the fabric. The idea is to postpone the transmission of unnecessary information as long as possible (until the point of merger). For example, the information flowing from an IC or a TC to a first router in the fabric may include the base data word field W 325 and may not include one or more of the fields E 320, B 315 and C 310. Since the information in those fields are not transmitted, savings in area cost, buffer cost and also wiring cost can be obtained. In these situations, the data chunk may not be as wide as compared with a situation when all of the fields are transmitted.

One tradeoff with the above approach occurs when one initiator requires only the fields B 315 and W 325, the field E 320 also need to be added. More wires and buffering may be necessary but combining them may be simple. This is why the fields of the CDF is arranged in the sequence illustrated in FIG. 3A with the most frequently used fields first (in the least significant bits) and the less frequently used fields later (in the most significant bits). Note that it is not permissible to transmit only the fields B 315 and W 325.

Figure 3C:
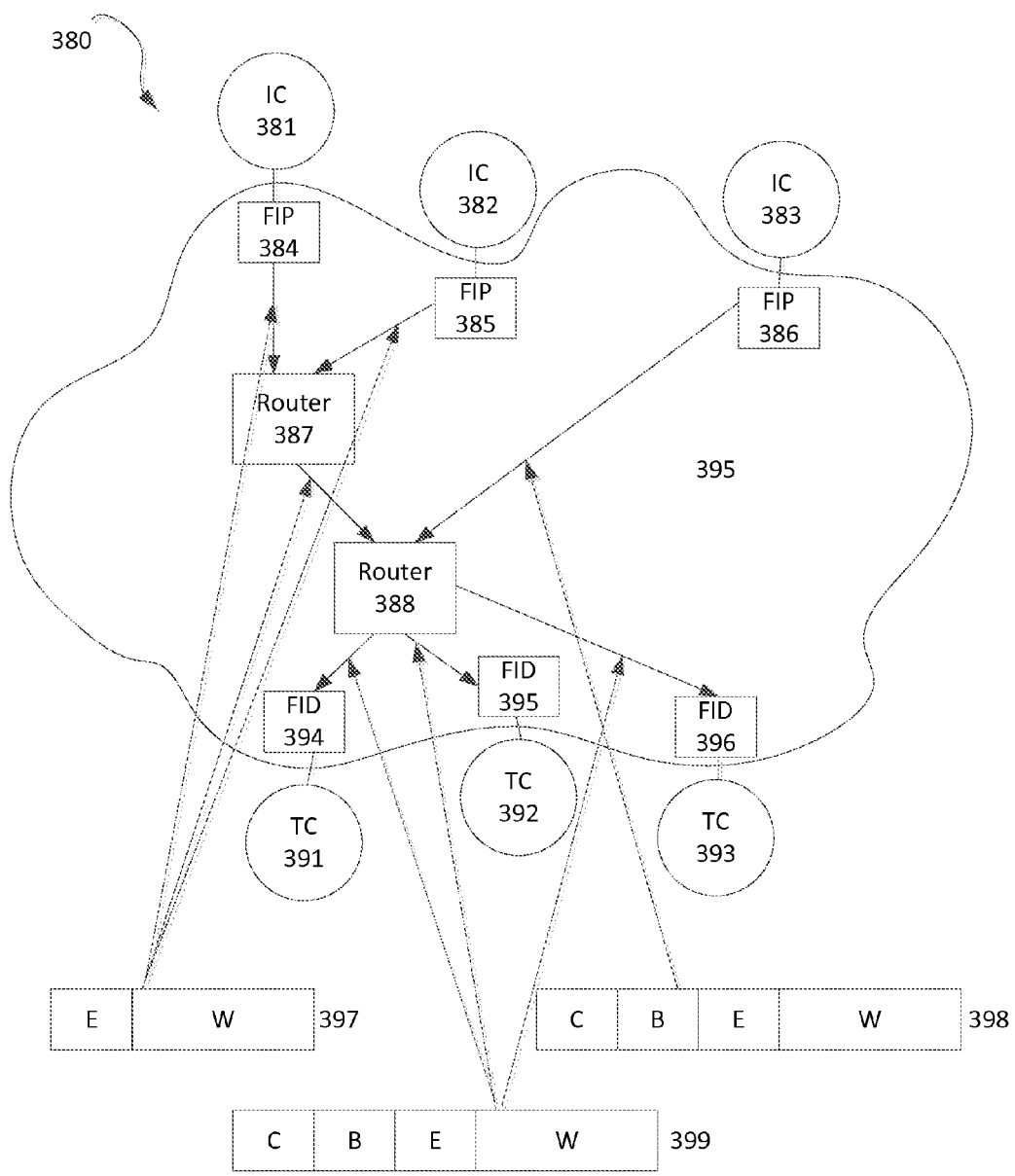
FIG. 3C illustrates an example embodiment of a transmission of CDF data chunks.

FIG. 3C illustrates an example embodiment of a transmission of CDF data chunks. Diagram 380 includes the ICs 381, 382 and 383 and the TCs 391, 392 and 393. The IC 381 is associated with the FIP 384, the IC 382 is associated with the FIP 385, and the IC 383 is associated with the FIP 386. The TC 391 is associated with the FID 394, the TC 392 is associated with the FID 395, and the TC 393 is associated with the FID 396. In the request network where the requests go from the IC to the TC, the FIP is part of the initiator agent (IA) and the FID is part of the target agent (TA). In the response network, the FIP is part of the TA and the FID is part of the IA, where the responses go from the TC to the IC.

At derivation time, the designer determines how the data from the IC comes into the fabric 395. The designer describes the network by examining the agents to find out which fields (byte enable, byte data, data word) are required by those agents. Based on that, the chunks are optimized so that only needed fields are transmitted. The FIP 384, 385 or 386 is the module that converts the incoming information into the CDF. If only the field E is required, then the fields B, E and W are transmitted. If the fields B and E are both required, then the fields D, E and W are transmitted. The missing fields will be added by the router by padding the data chunk with some known data. This padding is performed by the link width conversion module (described below) in the router. For example, when a router with a link width of 48 bits receives data from two ICs, one at 48 bits and one at 36 bits, the 48 bits data may be sent out from the router as is, while the 36 bits data is padded with an extra 12 bits. The router does not have to know what those fields are. When some fields are not passed from an initiator, it is interpreted that those fields are not important to that initiator (in the request network). The information about what fields are passed by the IC may be specified by the designer. For some embodiments, the fabric generation code may be able to figure the fields that are passed by the IC by examining the interface configuration of the IC and the TC that the IC is connected to.

The ICs 381 and 382 may transmit data to the router 387 in the fabric 395. The data from the IC 381 and IC 382 may not need to have all of the fields (even though they do still have the length of a data word). For example, the data from the ICs 381 and 382 may have the format of the data chunk 397 with just the fields W and E. In this example, not all of the fields in the CDF are transmitted from the router 387 to the router 388. Only the needed fields are transmitted. The data chunk that leaves the router 387 also has the same format as the data chunk 397. A system parameter may be used to indicate where a field is disabled or not used (e.g., by setting a bit to true or 1). The disabled field(s) can be optimized and dropped until a point of merger. As another example, the data from the IC 383 may have the format of the data chunk 398. The chunks coming from the router 387 are narrower, and the chunks coming from the IC 383 are wider. The chunks from the router 387 and the IC 383 arrive at a merging point at the router 388. The router 388 is configured so that the chunks coming out of the router 388 will have all the fields W, E, B and C as shown in the data chunk 399. As noted, this approach delays the addition of the unnecessary fields until the data chunks arrive at the router 388, the point of merger. The FIDs 394, 395 or 396 has to decode/convert the data from the CDF to the regular format that the TCs 391, 392 or 393 understands. The advantage of the CDF is less wiring complexity especially when link width conversion is performed at the router. All of the elements in the fabric 396 views the data chunks in the CDF with all of the fields. When the network is a response network, similar rules used with the request network are applicable except that the field R 330 is mandatory.

Figure 4:
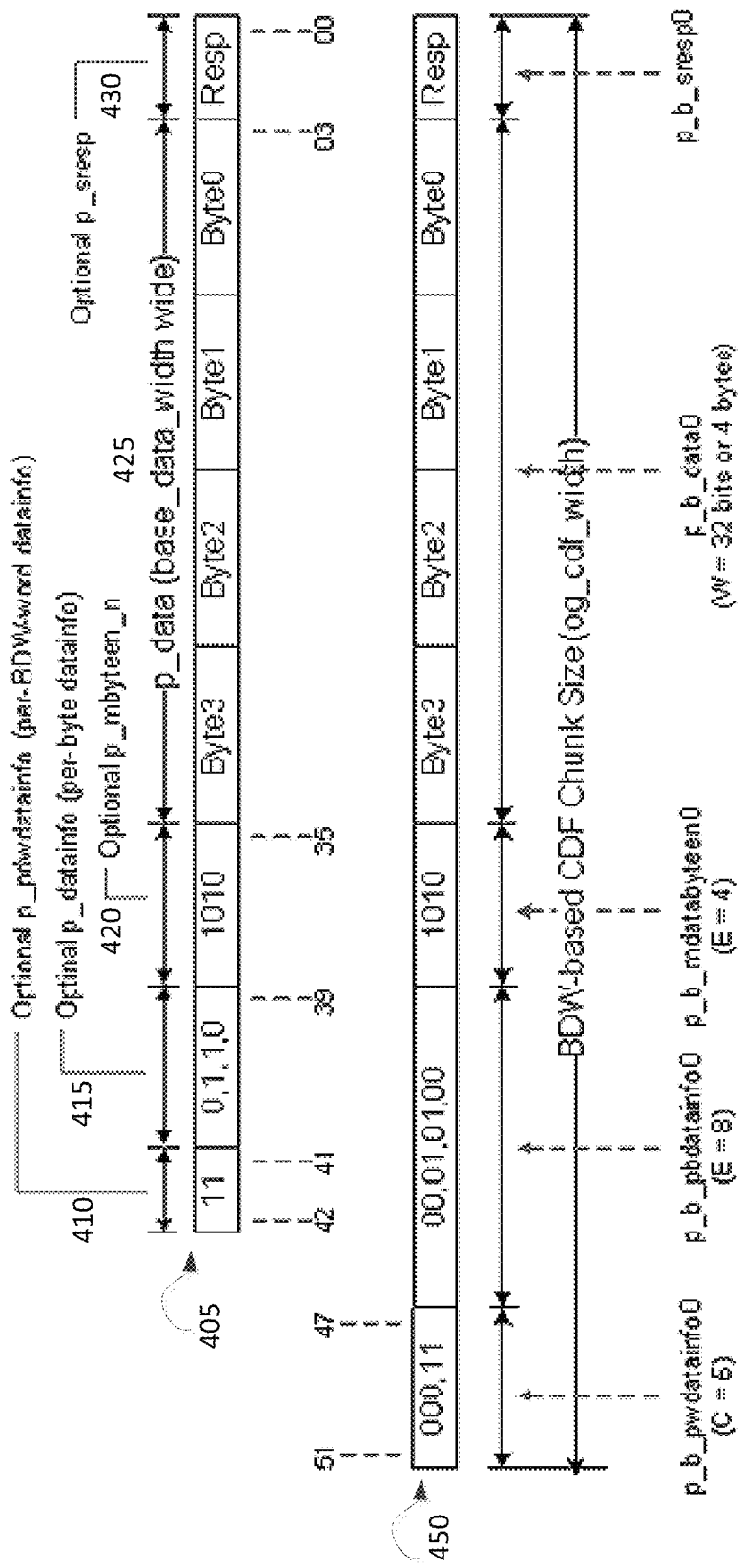
FIG. 4 illustrates an example embodiment where the width of the incoming word is the same as the base data word.

FIG. 4 illustrates an example embodiment where the width of the incoming word is the same as the base data word. In this example, word 405 represents the incoming word, and word 450 represents the CDF word or the base data word. With respect to the word 405, the width 425 of the base data word is 32 bits or four (4) bytes (byte 0, byte 1, byte 2 and byte 3). The byte enable field E 420 is enabled and includes four bits, one bit per byte in the base data word. The per byte data information 415 includes four bits and correspond to the number of bytes within the word. The per word data information 410 includes two bits and is applicable to the whole base data word. With respect to the corresponding CDF word 450, the width of the base data word is 32 bits or four (4) bytes (byte 0, byte 1, byte 2 and byte 3). The byte enable field is enabled and includes four bits, one bit per byte in the base data word. The per byte data information includes eight bits and correspond to the number of bytes within the word. The per word data information includes five bits.

Figure 5:
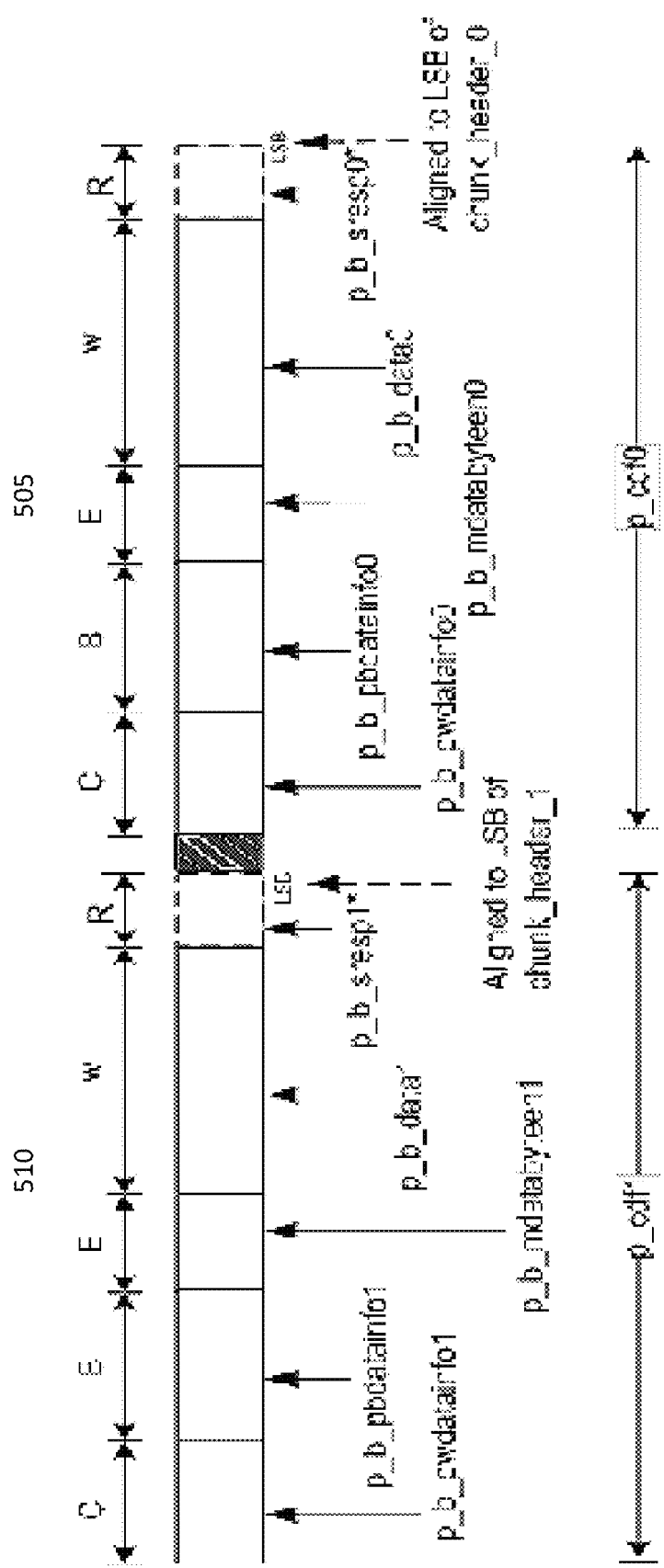
FIG. 5 illustrates an example embodiment where the width of the incoming word is twice the size of the base data word.
Figure 6:
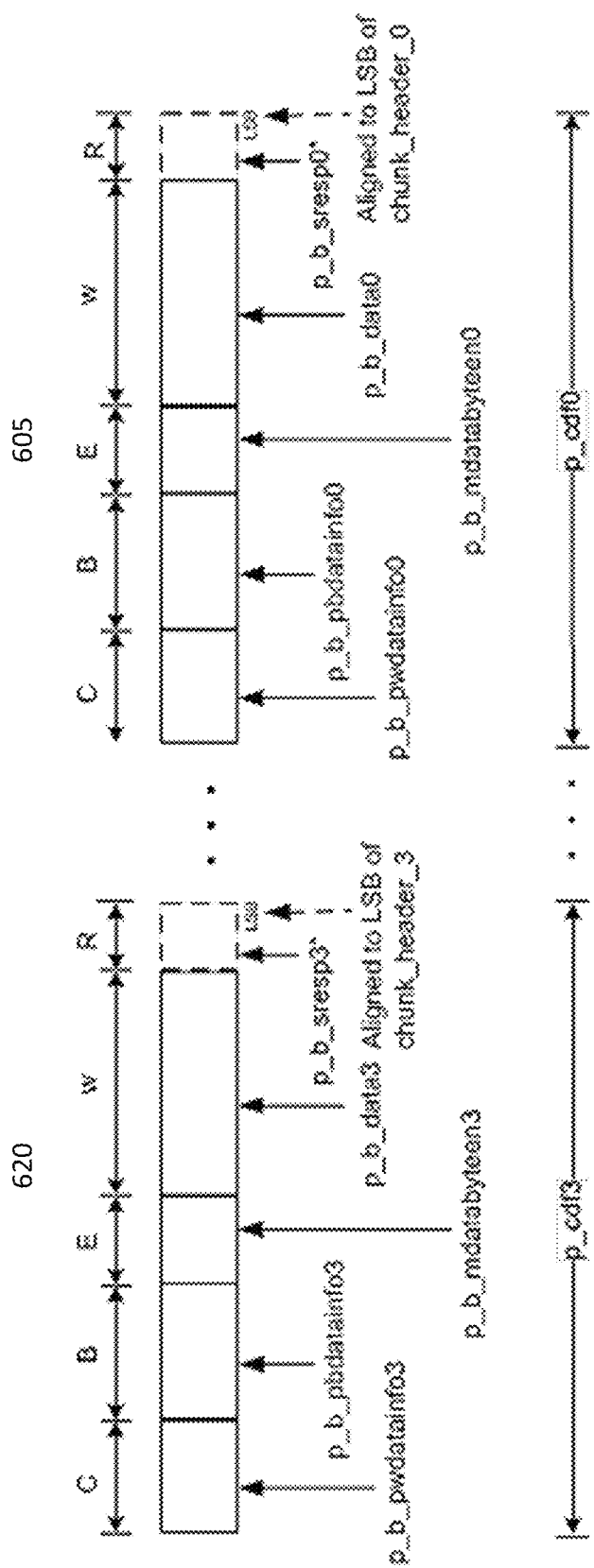
FIG. 6 illustrates an example embodiment where the width of the incoming word is four times the size of the base data word.

FIG. 5 illustrates an example embodiment where the width of the incoming word is twice the size of the base data word. In this example, two copies of the CDF chunk are instantiated in each cycle. The data portion of the incoming word is copied into the data portion (the field W) of the CDF chunks 505 and 510 starting from the LSB. FIG. 6 illustrates an example embodiment where the width of the incoming word is four times the size of the base data word. In this example, four copies of the CDF chunk are instantiated in each cycle. Only the first CDF chunk 605 and the fourth CDF chunk 620 are shown. The second and third CDF chunks are interpreted to be located between the first and fourth CDF chunks 605 and 620. The data portion of the incoming word is copied into the data portion (the field W) of the four CDF chunks starting from the LSB.

The width of the base data word or width (W) is the minimum word size among all ICs and TCs associated with the orthogonal group. For some embodiments, the data word sizes supported for an orthogonal group may be in the range: (width (W): n*width (W)), where n is power of 2 and with a maximum value of n=4. The data word is related to MData and SData in OCP, RDATA and WDATA in AMBA AXI. The data-byte-enables field E is present if any initiator-target pair has this field in the associated orthogonal group. When the E field is present, the width of the E field may be determined using the following formula:

$$\text{width}(E) = \text{width}(W)/8.$$

Following is a method that may be used to determine the width of the byte data information field B or width (B). Let $b_{Ij}$ the number of bits per byte specified for the B field for an Initiator $I_j$. Let $b_{maxI}$ be the maximum width for all initiators in an orthogonal group. Let $b_{maxT}$ be the corresponding width for all targets in that orthogonal group. The width of the B field or width (B) for that orthogonal group may be determined using the following formula:

$$B = \min(b_{maxI}, b_{maxT}).$$

When none of the initiators associated with the orthogonal group have the B field, then the B field is not instantiated in the common data format. When a TC has the B field, then the associated FID may zero fills the corresponding field in PML/DL. If none of the targets associated with the orthogonal group have the B field, then this field is not instantiated in the common data format.

Following is a method that may be used to determine the width of the word data information field C or width (C). Let $c_1$ be the maximum width (in bits) of the C field for all initiators and targets belonging to an orthogonal group, which are single word (i.e., data word width=w). Let $c_2$ and $c_4$ be the corresponding sizes for double word (i.e., data word width=2w) and quad word (i.e., data word width=4w). The width of the C field or width(C) (for that orthogonal group may be determined using the following formula:

$$C = \max(c_1, \text{ceiling}(c_2/2), \text{ceiling}(c_4/4))$$

If none of the initiators associated with the orthogonal group have the C field, then the C field is not instantiated in the common data format. When a TC has the C field, then the associated FIP may zero fills the corresponding field in PML/DL. If none of the targets associated with the orthogonal group have the C field, then this field is not instantiated in the common data format.

Alignment

At a particular link (or router), the chunk payload width is determined either by the width of the data chunk at that link or by the width of the header payload chunk based on the following formula:

$$\text{chunk\_payload\_width} = \max(\text{chunk\_header\_width}, \text{chunk\_data\_width})$$

where the chunk_data_width is the width of the chunk data (or CDF chunk).

Figure 7A:
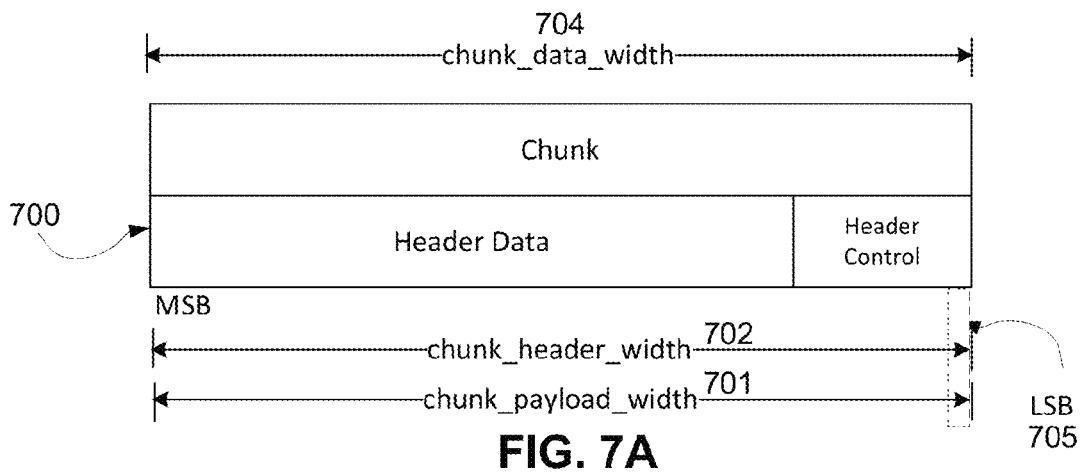
FIG. 7A illustrates an example embodiment of chunk alignment.

FIG. 7A illustrates an example embodiment of chunk alignment. A chunk payload includes all the data included in a chunk. This includes the actual data and any padding. For example, when the chunk is a data chunk, the chunk payload includes the data in the field W 325 and, when needed, zero or more of the optional fields E 320, B 315 and C 310 (when needed), and any padding (when there is a gap), and the field R 330 (when used with a response network). When the chunk is a header, the chunk payload may include header control (for the first header), header data and any padding (when there is a gap).

Figure 7B:
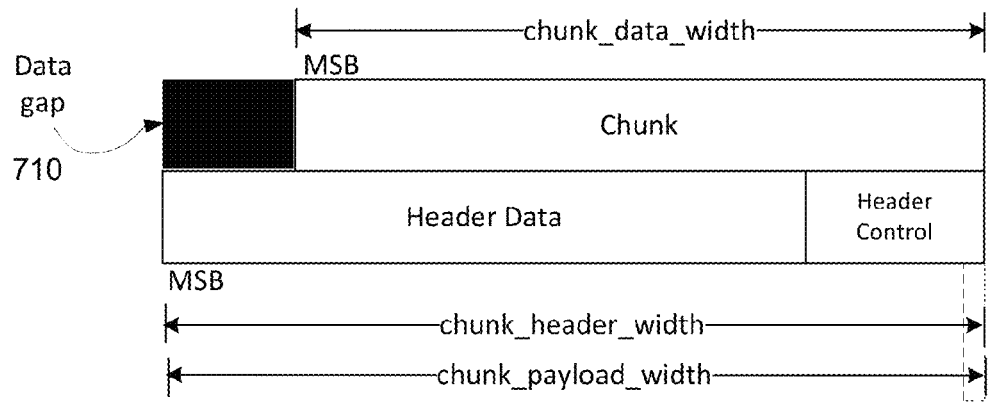
FIG. 7B illustrates an example embodiment of chunk alignment where there is a gap in the body portion.
Figure 7C:
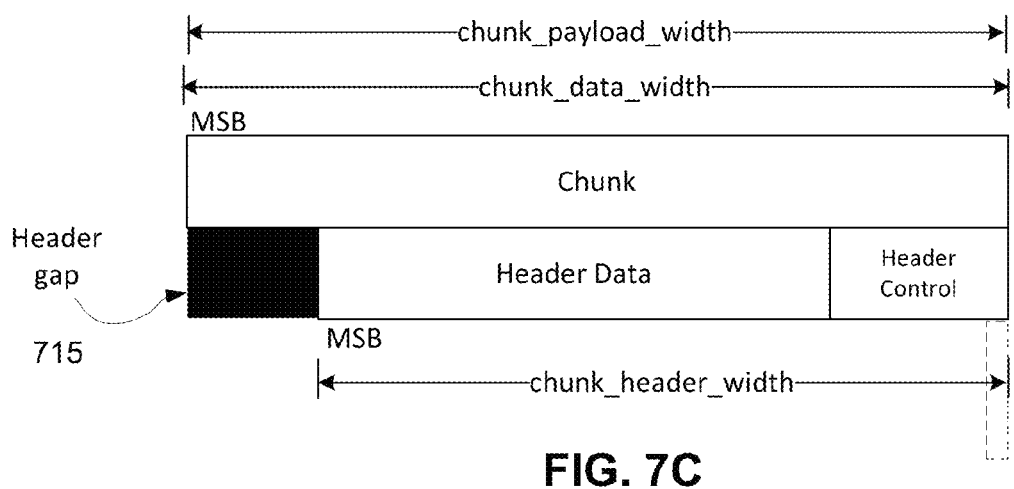
FIG. 7C illustrates an example embodiment of chunk alignment where there is a gap in the header portion.

Referring to FIG. 7A, since the chunk header width and the chunk data width have the same size, the chunk payload width is the same as either one. Block 700 illustrates the alignment of a data chunk and a header chunk. The header chunk includes the header control and the header data. The chunk payload width 701 is set as the maximum of the chunk header width 702 and the chunk data width 704. FIG. 7B illustrates an example embodiment of chunk alignment where there is a gap in a chunk payload of the body portion of the packet. In this example, the chunk data width 711 is narrower than the chunk header width 712. As such, the chunk payload width is the same as the chunk header width. Gap/padding exists in the chunk payload associated with the chunk data. FIG. 7C illustrates an example embodiment of chunk alignment where there is a gap in a chunk payload of the header portion of the packet. In this example, the chunk data width 716 is wider than the chunk header width 717. As such, the chunk payload width is the same as the chunk data width 716. Gap/padding exists in the chunk payload associated with the header data. The padding may be done automatically. The gaps 710 and 715 may not need to be explicitly tracked. For some embodiments, each of the header and data chunks are aligned based on the least significant bits (LSB). This is important during link width conversion when several chunks are combined into a wider link. The FID is configured to recognize where the gap is statically.

The multiple flit headers may be generated by grouping the information that is commonly used in the first part of the header and the information that is less commonly used in the last part of the header. These flits may have more input VCs combined at a common merging point in a router. It may be noted that the header payload chunk is the same for the entire orthogonal group.

Figure 8:
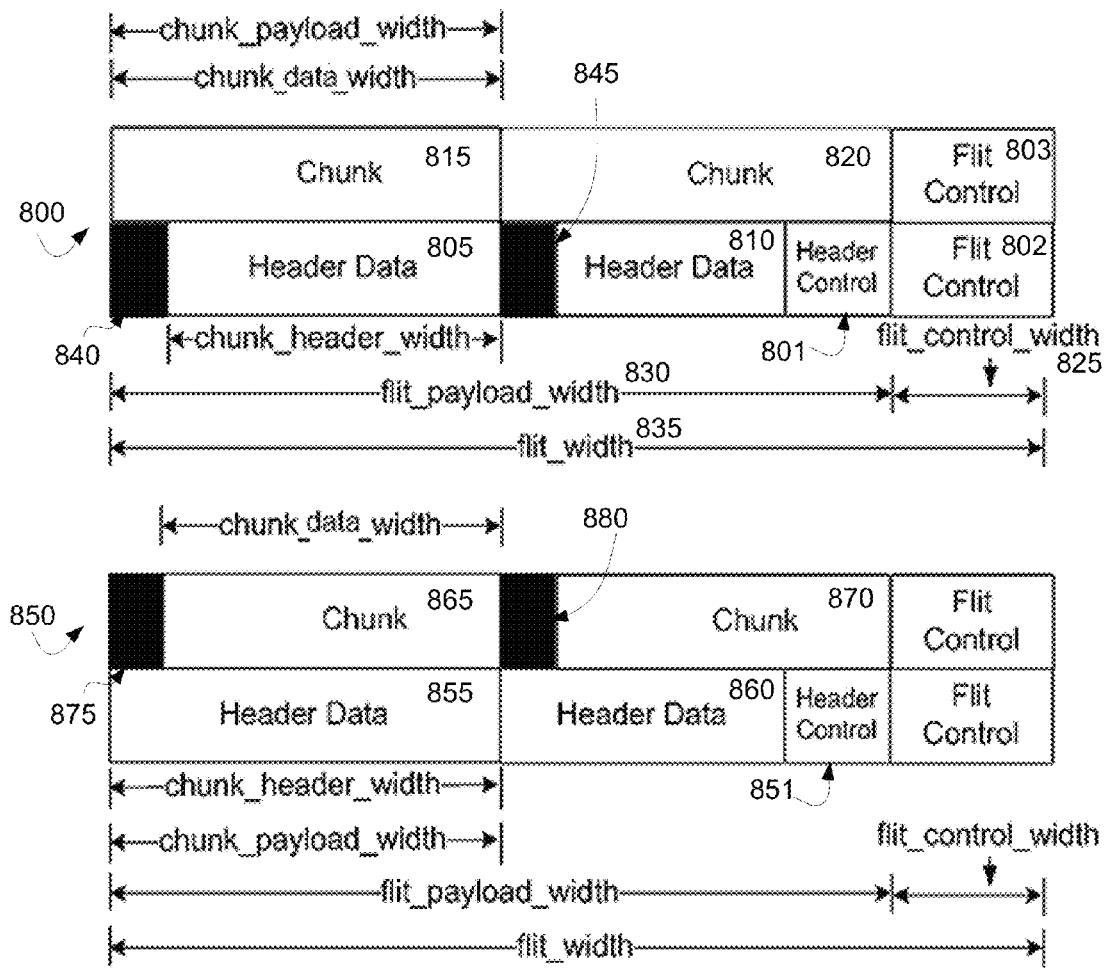
FIG. 8 illustrates an example embodiment of determining flit width.

FIG. 8 illustrates an example embodiment of determining flit width. Each link or router in the interconnect is associated with a width conversion ratio. The ratio indicates the width of the router relative to the base data word size. The flit payload width 830 used at each router is determined based on the following formula:

flit_payload_width=width_conv_ratio*chunk_payload_width.

The flit width 835 is determined based on the following formula:

Flit width=flit payload width+flit control width

The example in FIG. 8 also illustrates a structure of a flit relative to the data chunk and the header chunk. Packet 800 in this example is a two-flit packet. Each flit has a width 835, which includes a flit payload having width 830 and a flit control having width 825. The first flit includes a flit control 802, a header control 801 and two chunks, one including the header data 810, the other including the header data 805. The second flit includes a flit control 803 and two data chunks 820 and 815. The flit control signals are unique to each router and are determined by derivation. Since the chunk data width of the chunk 815 is wider than the chunk header width of the header data 805, the chunk payload width is the same as the chunk data width. Padding is applied to fill the gap 840 (header padding). Similarly, for the header data 810, padding is applied to fill the gap 845. For the packet 800, the first header payload includes the header control 801 and the header data 810, while the second header payload includes the header data 805. The packet 800 also includes two chunk data payloads, the first one including the data chunk 820, the second one including the data chunk 815.

The packet 850 is also a two-flit packet. The first flit includes the header control 851 and the header data 860 in the first chunk and 855 in the second chunk. The second flit includes flit control field and data chunks 870 and 865. In this example, the chunk data width (of the data chunk 865) is narrower than the chunk header width of the header data 855. The chunk payload width is set to be the same as the chunk header width. Padding is used to fill the gap 880 (chunk padding).

Header Payload and Data Payload

FIG. 9A illustrates an example embodiment of a packet that includes a header flit and multiple body flits. In a request network, the packetization logic associated with the initiator is configured to determine the size of the header and the address to be included in the header. The designer of the network derives the information about chunk size statically. The packetization logic performs the breaking up of the data into the chunks using the information determined by the designer. The packet 905 includes a header portion and a body portion. The header portion of the packet 905 in this example is a one-flit header. It includes the flit type information, the header control fields and the header payload fields. In this example, the flit type for the flit F0 indicates that it is a header flit and followed by a body flit. The body portion of the packet 905 includes the body flits F1 and F2 and their flit type information. In this example, the flit type of the flit F1 indicates that it is a body flit, and the flit type of the flit F2 indicates that it is a body flit, and it is also a tail flit.

FIG. 9B illustrates an example embodiment of a packet that includes multiple header flits and multiple body flits. The packet 950 includes header flits F0, F1 and F2 and body flits F3, F4 and F5. The flit type for the flits F0 and F1 indicate that they are header flits and followed by another header flit. The flit type for the flit F2 indicates that it is a header flit and followed by a body flit. The flit type for the body flits F3 and F4 indicates that they are body flits and followed by another body flit. The flit type for the body flit F5 indicates that it is a body flit and is also a tail flit. As illustrated, the body flits include the data payload and the header flits include the header payload. It may be noted that the data payload may include multiple data chunks with chunk data width 955. The chunk payload width is equal to the chunk data width 955 plus the width of the gap 960. Similarly, the header payload 965 may include multiple header chunks.

It may be noted that even when it is determined that the orthogonal group has multi-flit headers, some initiators and paths or partial paths do not need to generate multi-flit headers based on their socket characteristics. Even though a packet protocol is used, those initiators may generate only the first part of the header (i.e., only the first or first few flits). The FID takes care to properly interpret them based on the flit encoding or the downstream external socket characteristics.

The header may be packetized based on (1) the need for all of the header control information to be present in the first flit of the header portion, (2) the width of the data chunk, and (3) the latency-area considerations determined by derivation (possibly with input by the designer). Thus, at a particular link, the payload width of the chunk is determined either by the width of the data chunk at that link or by the width of the header payload chunk. The multiple flit headers may be generated by grouping the information that is commonly used in the first part of the header and the information that is less commonly used in the last part of the header. These flits may be eventually be combined at a common merging point. It may be noted that the width of the header payload chunk is the same for the entire orthogonal group.

Link Width Conversion

Figure 10A:
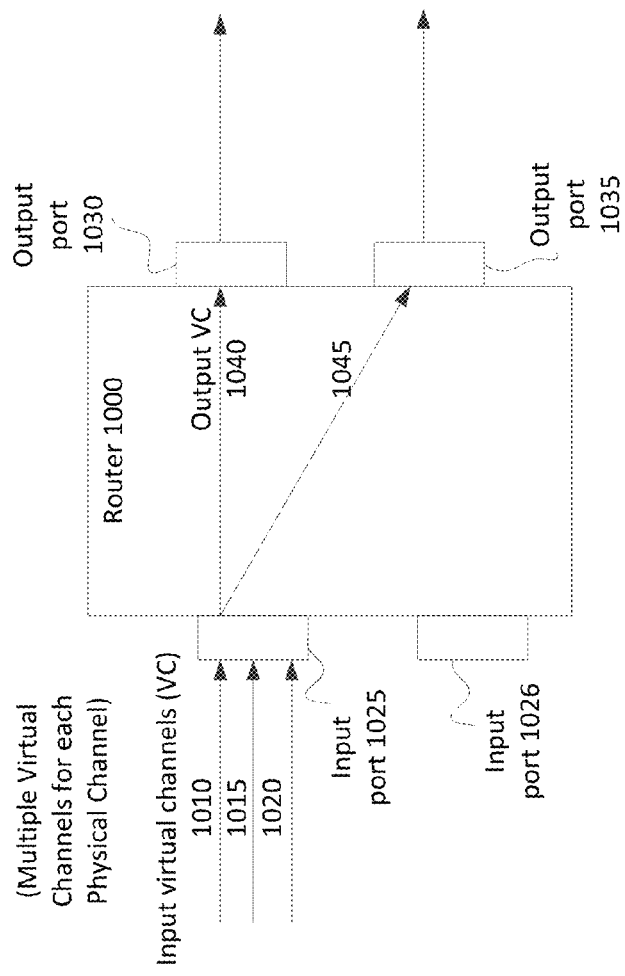
FIG. 10A illustrates an example of input and output ports of a router.

FIG. 10A illustrates an example of input and output ports of a router. Router 1000 may include multiple input ports 1025, 1026 and multiple output ports 1030, 1035. The input port 1025 may be associated with multiple input VCs 1010, 1015, 1020. The packets or their associated flits may be received by the router 1000 via the input VC 1010 and then forwarded by the router 1000 to the next hop via the output port 1030. In operation, one input VC can be mapped to only output VC per route computation. As described in FIG. 2, the VA module 215 allocates the output VC, and the SA module 220 allocates the output port.

The packets include control or routing information to indicate the path that the fabric 118 is required to use to forward the packets to their intended destination. For example, the next hop for an incoming packet can be determined by looking at the first four (4) most significant bits (MSBs) of the routing field of the header flit where the first two MSBs may be used to determine the output port, and the next two MSBs may be used to determine the output VC. The width of each of the input ports 1025, 1026 and the width of the output ports 1030, 1035 of the router 1000 may be configured independently. When the width of an input port and an output port pair is not the same, link width conversion may need to be performed. The specific type of link width conversion to be performed depends on the router connectivity and the associated widths of the ports. Based on the input port to output port width ratio, there may be three different types of link width conversion, including (a) Narrow-to-wide (N2W) conversion when the incoming narrower flits are accumulated to form a wider outgoing flit, (b) Wide-to-narrow (W2N) link width conversion when the incoming wider flits are broken up to match with the outgoing narrow flits, and (c) no width conversion when the incoming flits are passed through unmodified to the output port. The link width conversion module 280 (shown in FIG. 2) may be configured to perform these conversion operations.

For some embodiments, the link width conversion ratio between the incoming flits and corresponding outgoing flits associated with the same packet may be determined based on using a ratio of a width parameter of the incoming link and a width parameter of the outgoing link (e.g., the PL link 173A illustrated in FIG. 1C). When an input VC of an input port has connections to multiple output ports (as illustrated with the output VC 1040 and 1045), it may be associated with more than one width conversion ratio. It may be noted that an input VC of a router may not be associated with a W2N link width conversion and a N2W link width conversion in a router to the same output port at the same time. However, an input VC may be associated with multiple wider output ports under N2W link with conversion based on the same (e.g., 1 to 4: 4 input flits packed into 1 output flit) or different conversion ratios (e.g., 1 to 4 and 1 to 6). Similarly, an input VC may be associated with multiple narrower output ports under W2N link width conversion (e.g., 4 to 1: 1 wider input flit broken into 4 narrower output flits) based on the same or different conversion ratio. For example, the output VC 1040 may have more the input VCs 1010 and 1015 mapped to it and the VA module 215 may receive multiple requests simultaneously.

When performing a W2N conversion (e.g., 1 wider input flit broken into 4 narrower output flits), there may be an unused portion in the header. The unused portion may be identified as the inactive words. This information may be included in the flit control field. The inactive words are normally in the trailing portion of the header payload, not in the middle. In that sense, the data in the header payload is front loaded. When processing the header, the logic in the router may examine the flit control field and ignore the inactive words.

Figure 10B:
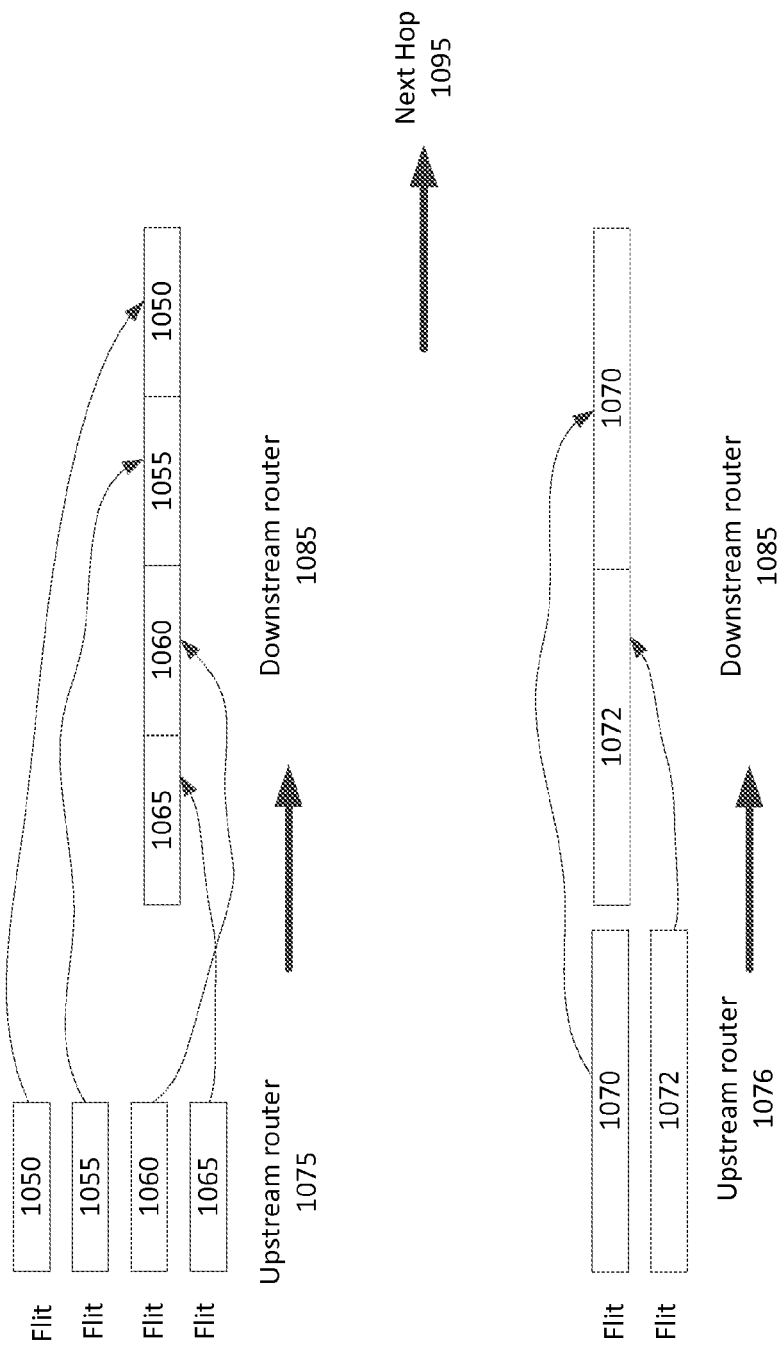
FIG. 10B illustrates an example of link width conversion.

FIG. 10B illustrates an example of link width conversion. In this example, there are two upstream routers 1075 and 1076, and one downstream router 1085. The upstream routers 1075, 1076 and the downstream router 1085 may be configured to have different output port width and input port width. For example, the width of an output port of the upstream router 1075 may be 64 bits while the width of the input port of the downstream router 1085 may be 256 bits. As such, the downstream router 1085 may need to accumulate four flits 1050, 1055, 1060 and 1065 from the upstream router 1075 before the accumulated flits may be ready for arbitration in the downstream router 1085. Similarly, the width of the upstream router 1076 may be 128 bits, and the downstream router 1085 may need to accumulate two flits 1070 and 1072 from the upstream router 1076 before the accumulated flits may be ready for arbitration in the downstream router 1085. This is referred to as narrow-to-wide link conversion. The link conversion module 280 may perform link conversions for the flits coming from the upstream routers 1075 and 1076. The upstream router 1075 may be forwarding one flit at a time. As such, the downstream router 1085 may wait until all four flits 1050, 1055, 1060 and 1065 are received before arbitration is performed by the VA module and the SA module in the downstream router 1085. When access to an output port of the downstream router 1085 is granted, the four flits 1050, 1055, 1060 and 1065 may be forwarded together as a chunk to the next hop 1095. If the width of the input port of the downstream router 1085 is 16 bits instead of 256 bits, a wide-to-narrow link conversion may be performed. In this situation, the flit 1050 may be broken up into smaller flits.

For some embodiments, width conversion is achieved with CDF by separating multiple chunks into narrower chunks (in wide-to-narrow conversion) or by placing multiple chunks adjacent to each other (in narrow-to-wide conversion)—akin to placing lego blocks next to each other. A router design without using the CDF would be more complex to design and verify. For example, with using the CDF, when a narrow-to-wide conversion is to be done, individual subfields within each data word needs to be explicitly combined at the router to yield the new wide word. This would require additional logic and is not wiring friendly. With wide-to-narrow conversion, individual subfields need to be separated or unscrambled to yield the new narrow word. This would require additional logic. Finally, even with no width conversion, when two separate input ports of a router are connected to a common output port, the individual subfields of data from each output port need to be examined to determine the larger width of the subfield to be used for the outgoing output port. The design is not only more complex but is error prone.

For some embodiments, the link width conversion module 280 (illustrated in FIG. 2) of a downstream router may pack or unpack the flits received from the upstream router, update the flit control filed so that the flit type of the incoming flits matches with the flit type of the outgoing flits, and other functions. The link width conversion module 280 may not modify the data included in the payload portion.

For some embodiments, a minimum amount of storage to be allocated to the VC storage is configured based on a width conversion ratio associated with a particular input VC. As mentioned, each input VC is associated with its own reserved VC storage and a shared VC storage. When there is a N2W link width conversion, there should be enough storage to support a maximum N2W link width conversion for the particular VC. Thus, the reserved VC storage for each input VC may need to have enough entries to support the N2W width conversion. For example, when there is a link width conversion ratio of 1:4, the VC storage needs to include at least 4 entries in order to support 1:4 conversion ratio. Even when the flits are placed into the shared VC storage, they are still identifiable as being associated with their corresponding input VCs. It may be possible for a header flit associated with a packet to be stored in the reserved VC storage while the body flits and tail flit associated with the same packet may be stored in the shared VC storage.

Narrow-to-Wide Width Conversion

For the incoming header or data payload flits (flit type is B or BT), the packing/unpacking order (left to right or right to left) is based on the value of a packing signal carried in the incoming flit. This packing signal is used by width converter to determine packing/unpacking CDF chunk order (left to right or right to left). For example, a value of 0 indicates the order of left to right, and the value of 1 indicates the order of right to left.

The packing operation of an outgoing flit starts from BDW-based CDF chunk 0 to the last CDF chunk. The number of CDF chunks packed in the outgoing flit is determined by the conversion ratio and the types of the accumulated incoming flits. The following Table 1 illustrates different examples of flit type transformation under N2W link width conversion.

TABLE 1

| 4-to-1 Header c_flit_type Transformation under Width Conversion | | 2-to-1 Header c_flit_type Transformation under Width Conversion | |
|---|---|---|---|
| Narrow Packet Sequence | Wide Packet Flit Type | Narrow Packet Sequence | Wide Packet Flit Type |
| H, H, H, H | H | H, H | H |
| H, H, H, HB | HB | H, HB | HB |
| (H, H, HB), body flit | (HB), body flit | (HB), body flit | (HB), body flit |
| (H, HB), body flit(s) | (HB), body flit | HT | HT |
| (HB), body flit(s) | (HB), body flit | | |
| HT | HT | | |

| 4-to-1 Body c_flit_type Transformation under Width Conversion | | 2-to-1 Body c_flit_type Transformation under Width Conversion | |
|---|---|---|---|
| Narrow Packet Sequence | Wide Packet Flit Type | Narrow Packet Sequence | Wide Packet Flit Type |
| B, B, B, B | B | B, B | B |
| B, B, B, BT | BT | B, BT | BT |
| B, B, BT | BT | BT | BT |
| B, BT | BT | | |
| BT | BT | | |

The first two columns of Table 1 show the 4-1 transformation under link width conversion, and the second two columns show the 2-1 transformation under the link width conversion. In the first two columns, the flit type of the newly formed wider flit inherits the flit type value of the last narrow flit packed in the outgoing flit. The following factors determine whether or not a pack is complete: (1) The width conversion ratio, which is the ratio between the incoming width conversion ratio parameter value and the outgoing width conversion ratio parameter value, and (2) the framing boundaries in the narrow packet, i.e., the HB, HT, or BT flit.

An inactive-words field (e.g., 4-bit wide) is used to encode a number of invalid BDW CDF chunks embedded in a flit. The encoded value may range from 0 through 15 where the maximum value is limited by the width conversion ratio parameter value minus 1. On an outgoing link, all valid/invalid CDF chunks reside continuously on one side of the flit. The value of the packing signal and the value of the inactive words together indicate the location of the valid/invalid CDF chunks in the flit. For a data payload flit (i.e., flits with B or BT type), the value for inactive words of an outgoing flit needs to be re-generated to reflect the number of invalid BDW-based CDF chunks in the newly formed wider flit. This transformation is done by the router based on the inactive words value of the incoming flits and the conversion ratio.

Wide-to-Narrow Width Conversion

For each incoming header or data payload flit, its unpacking order is determined by the value of the packing signal in the incoming flit. The unpacking operation of an incoming flit may start from BDW-based CDF chunk 0 to the last CDF chunk in the incoming flit. The number of the resulting narrower flits (the unpacking boundary) is determined by the W2N conversion ratio and the number of valid CDF chunk(s) in the incoming flit. The W2N unpacking operation of an incoming PL flit is complete when all valid CDF chunk(s) are unpacked into the outgoing PL flit(s). The flit type field needs to be re-generated for each outgoing narrower flit. The general rule is that, when one incoming wider flit is unpacked into multiple outgoing narrower flits, the last outgoing flit keeps the flit type of the incoming wider flit, and the rest outgoing flits are converted to either H or B flits.

For a data payload flit (i.e., flits with B or BT type), the value for the inactive words of an outgoing flit needs to be re-generated to reflect the number of invalid BDW-based CDF chunks in the newly formed narrower flit. The router determines the outgoing flit's inactive words value based on the incoming flit's inactive words value, the incoming width conversion ratio parameter value, and the outgoing width conversion ratio parameter value. When a wider header flit (i.e., a flit with H, HB, or HT type) is unpacked into one or more outgoing narrower header flits, the inactive words field value of the incoming header flit is copied straight to the first unpacked outgoing flit. For the rest of the unpacked header flit(s), their inactive words fields are set to zero.

Link Width Conversion Structure

Figure 10C:
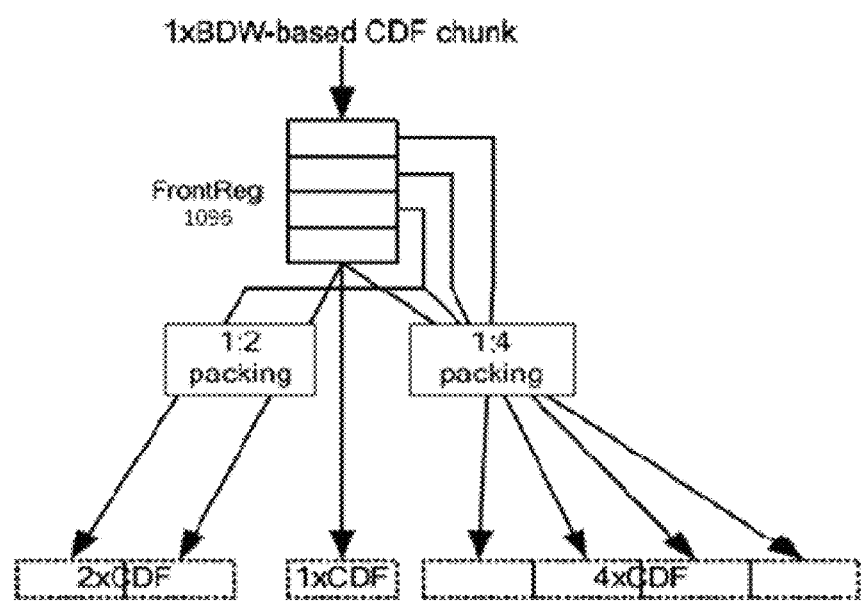
FIG. 10C illustrates a high-level block diagram of an example router link having N2W width conversions.

FIG. 10C illustrates a high-level block diagram of an example router link having N2W width conversions. For some embodiments, the width conversion supporting logic is built around per IVC FrontReg 1096. When an IVC supports narrow-to-wide width conversion, its FrontReg 1096 can be realized using a FIFO structure with multiple read ports. In the current example, the IVC is mapped to three output ports with output link data width of 2×CDF size, 1×CDF size, and 4×CDF size, respectively. Two width conversion logic blocks, a 1-to-2 packing block and a 1-to-4 packing block, are needed.

Figure 10D:
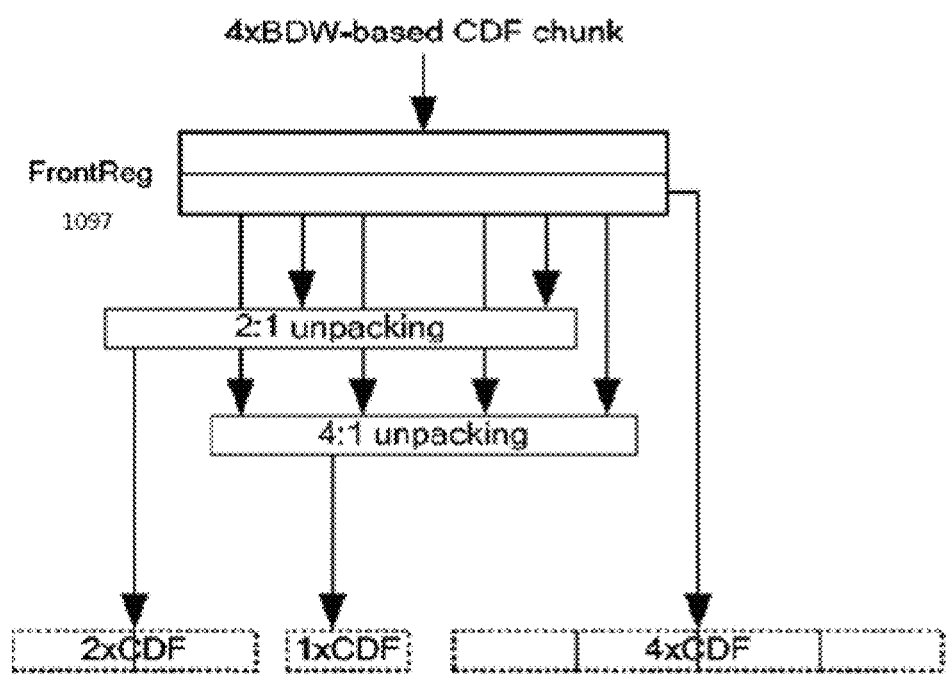
FIG. 10D illustrates a high-level block diagram of an example input VC that supports two W2N width conversions.

FIG. 10D illustrates a high-level block diagram of an example IVC that supports two W2N width conversions. When an IVC supports wide-to-narrow width conversion, each entry of its FrontReg 1097 can be unpacked into one or multiple flits. In the example, the IVC is mapped to three output ports with output link data width of 2×CDF size, 1×CDF size, and 4×CDF size, respectively. Two unpacking width conversion logic blocks, a 4-to-2 packing block and a 4-to-1 packing block are needed.

For some embodiments, the width conversion is a per input port to output port pair function. The width conversion type and ratio for each input port to output port pair is statically derived at the system derivation time. For each input VC to output port connection, only one conversion type and conversion ratio may be supported. After the pack/unpack operation is complete, an outgoing flit is ready. This flit needs to go through VA, SA, ST, and LT atomic processing operations by following the same process as for the non-width conversion.

Flow Control

Figure 11:
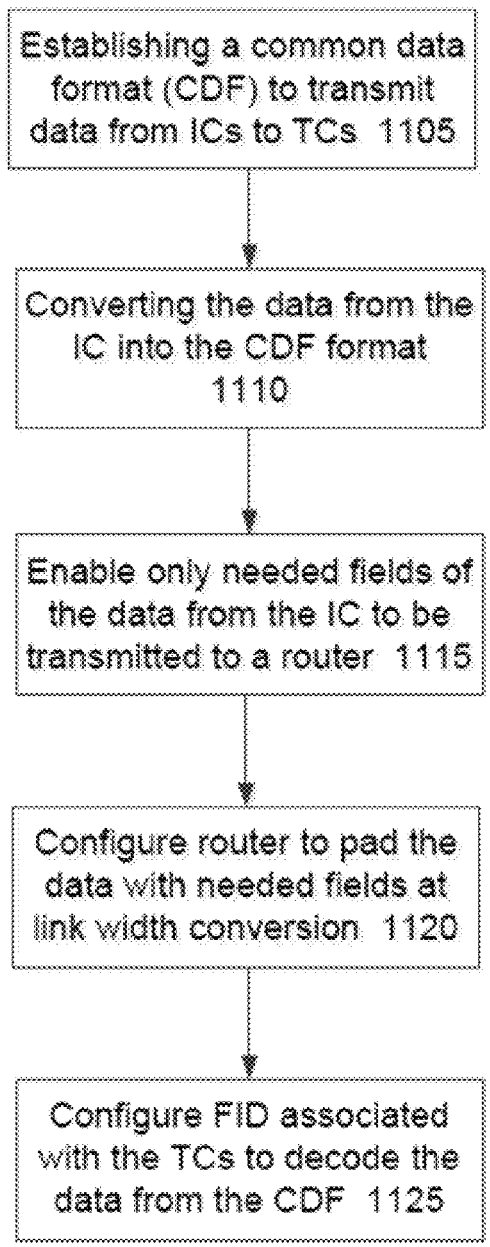
FIG. 11 is a flow diagram for an example process that may be used to transmit data into the fabric using the CDF according to some embodiments.

FIG. 11 is a flow diagram for an example process that may be used to transmit data into the fabric using the CDF according to some embodiments. The process is associated with a request network. At block 1105, a common data format is established to transmit data from the ICs to the TCs. At block 1110, a FIP associated with a IC is configured to convert data received from the IC into a CDF data chunk. As described above with FIGS. 3A and 3B, the CDF data chunk may include multiple fields (e.g., W, E, B and C for a request network) and the data used for these fields are derived from the data from the IC. The field W is mandatory, while the fields E, B and C may be optional. If one or more of the fields E, B and C are not included in the data from the IC, they may not be included in the CDF data chunk when the CDF data chunk is sent into the fabric, as shown in block 1115. The CDF data chunk may not be as wide as compared with a situation when all of the fields are transmitted. This may help reducing the wiring complexity. The narrow CDF data chunk may eventually arrive at a router in the fabric. The router may be associated with a base data word that is narrower than, the same as, or wider than the incoming CDF data chunk. When the width of the base data word is narrower, the CDF data chunk may be broken into smaller chunks. When the width of the base data word is the same as the CDF data chunk, no change may occur to the CDF data chunk. When the width of the base data word is wider, padding may be necessary to fill the gaps, as shown in block 1120. Note that even though one router is described here, it is understood to one skilled in the art that there may be more than one router. Note also that it is permitted for the routers to perform a width conversion even though the IC and the TC may be of the same data word width. This is desirable in cases where the fabric runs at a faster clock or in cases where the user desires an area-performance tradeoff. At block 1125, when the CDF data chunk arrives at a FID associated with the TC, the FID may decodes the CDF chunk and extract the data that the TC requires. The FID has enough knowledge to choose only the valid bits from the CDF data chunk and reformat that data to a format for the TC. The use of the CDF makes it relatively simple to handle such cases since the routers consider all the data related fields to be the payload information.

Simulation and Modeling

Figure 12:
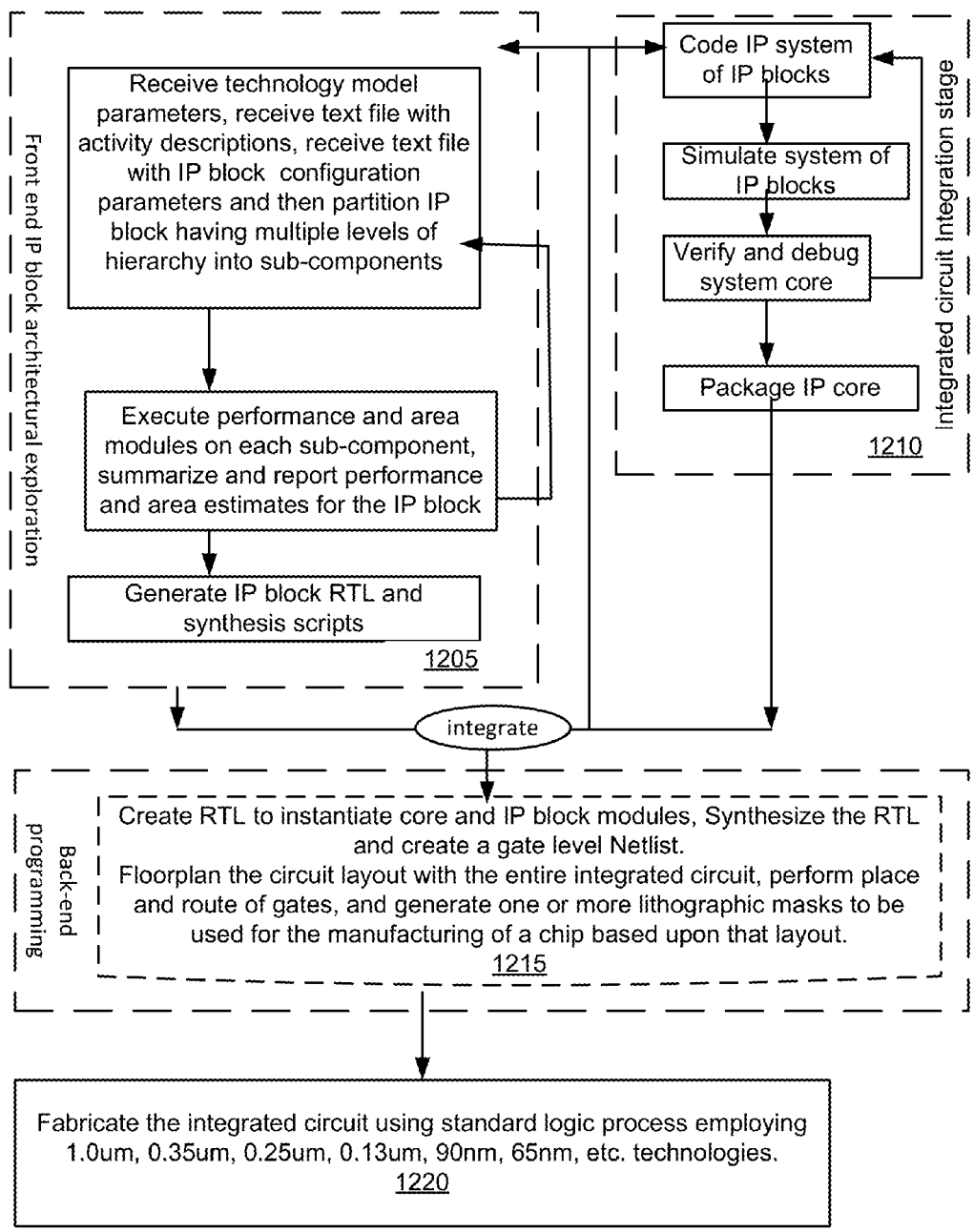
FIG. 12 illustrates a flow diagram of an embodiment of an example of a process for generating a device, such as a System on a Chip.

FIG. 12 illustrates a flow diagram of an embodiment of an example of a process for generating a device, such as a System on a Chip, in accordance with the systems and methods described herein. The example process for generating a device with designs of the Interconnect and Memory Scheduler may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry in the Interconnect, Memory Scheduler, etc. may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or model representations of the apparatuses such as simulations and lithographic masks, and/or methods described herein.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System on a Chip (SoC) inter block communication system that integrally manages input and output data, control, debug and test flows, as well as other functions. In an embodiment, an example EDA toolset may comprise the following: a graphical user interface (GUI); a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SoC design: front-end processing and back-end programming. The EDA toolset can include one or more of a RTL generator, logic synthesis scripts, a full verification testbench, and SystemC models.

Front-end processing includes the design and architecture stages, which includes design of the SoC schematic. The front-end processing may include connecting models, configuration of the design, simulating, testing, and tuning of the design during the architectural exploration. The design is typically simulated and tested. Front-end processing traditionally includes simulation of the circuits within the SoC and verification that they should work correctly. The tested and verified components then may be stored as part of a stand-alone library or part of the IP blocks on a chip. The front-end views support documentation, simulation, debugging, and testing.

In block 1205, the EDA tool set may receive a user-supplied text file having data describing configuration parameters and a design for at least part of a tag logic configured to concurrently perform per-thread and per-tag memory access scheduling within a thread and across multiple threads. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set potentially integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1210, a separate design path in an ASIC or SoC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation of the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic masks from Netlists of circuit and other similar useful results.

In block 1215, next, system integration may occur in the integrated circuit design process. Back-end programming generally includes programming of the physical layout of the SoC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SoC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 1220, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs.

As discussed, an EDA tool set may be implemented in software as a set of data and instructions, such as an instance in a software library callable to other programs or an EDA tool set consisting of an executable program with the software cell library in one program, stored on a machine-readable medium. A machine-readable storage medium may include any mechanism that stores information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. For example, the encoding and decoding of the messages to and from the CDF may be performed in hardware, software or a combination of both hardware and software. It has proven convenient at times, principally for reasons of common usage, to refer to these signals as bits, values, elements, symbols, characters, terms, numbers, or the like.

We claim:

1. An apparatus, comprising:
a flexible routing network for a Network on a Chip (NoC) architecture which connects disparate initiators and targets, the flexible network including multiple routers to enable transmitting a first transmission traffic from the initiators to the targets for request networks and from the targets to the initiators for response networks,
wherein packetization logic is located at an interface between an initiator or a target and the routing network and is configured to receive the first transmission traffic from the initiator or the target and packetize the first transmission traffic into packets,
wherein each packet includes a header portion and a body portion,
wherein each of the header portion and the body portion includes one or more standard sized transmission units, each standard sized transmission unit having a control section and a payload section,
wherein a payload section associated with the body portion includes one or more chunks formatted according to a common data format (CDF), each chunk including a first mandatory field, followed by zero or more mandatory fields, and followed by multiple optional fields, wherein the first mandatory field is aligned with a first set of least significant bits (LSB) of the chunk,
wherein all data transmissions within the routing network are based on the CDF, and
wherein the packetization logic is configured to encode the first transmission traffic into the one or more chunks formatted according to the CDF.

2. The apparatus of claim 1, wherein an optional field is not transmitted in the routing network when the optional field is not required by an initiator or a target associated with an identified set of connected initiator agents (IAs) associated with the initiators and target agents (TAs) associated with the targets.

3. The apparatus of claim 2, wherein the multiple optional fields are arranged according to frequency of use with a most frequently used optional field placed immediately next to and starting at a higher significant bit position from the first mandatory field and a least frequently used optional field placed furthest away from the first mandatory field, and wherein when a first optional field is present in the chunk, all optional fields more frequently used than the first optional field are also present in the chunk.

4. The apparatus of claim 3, wherein, for a response network, the chunk further includes a second mandatory field to indicate that the chunk is associated with the response network, the second mandatory field is aligned with a second set of LSBs of the chunk with the first set of LSBs occupying higher significant bit positions than the second set of LSBs.

5. The apparatus of claim 4, wherein a width of the first mandatory field is defined based on a base data word for the identified set of connected IAs or TAs, and wherein a CDF associated with the request network is derived differently from a CDF associated with the response network.

6. The apparatus of claim 5, wherein the standard sized transmission unit is a flit, wherein the header portion of the packet includes one or more header flits, and wherein the body portion of the packet includes one or more body flits, wherein the control section of the standard sized transmission unit includes a type to indicate whether the standard sized transmission unit is a head, a body, a head followed by another head, a head followed by a body, or a head and also a tail, or a body and also a tail.

7. The apparatus of claim 6, wherein each body flit includes one or more chunk payloads each having a chunk payload width which is equal to the width of the first mandatory field together with (1) widths of the present optional fields, (2) a width of the second mandatory field for the response networks, and (3) a width of a chunk padding when necessary.

8. The apparatus of claim 7, wherein each header flit includes one or more chunk payloads each having a chunk payload width which is equal to a width of a header chunk together with a width of a header padding when necessary, wherein the header chunk includes (1) header data and (2) header control when the header chunk is a first header chunk of the one or more header flits.

9. The apparatus of claim 8, wherein each of the multiple routers in the routing network is associated with a link width conversion ratio indicating a width of the router relative to a width of the base data word for the identified set of connected IAs or TAs.

10. The apparatus of claim 9, wherein a width of the payload section of the standard sized transmission unit at the router is determined based on the link width conversion ratio associated with the router and based on the chunk payload width, and wherein the CDF facilitates narrow-to-wide and wide-to-narrow link width conversion without having to manipulate subparts of data fields in the first transmission traffic.

11. The apparatus of claim 1, wherein depacketization logic located at the interface between the initiator or the target and the routing network is configured to receive the packets having the chunks formatted according to the CDF and decode the chunks into a second transmission traffic associated with the targets for the request networks or associated with the initiators for the response networks.

12. A computer-implemented method for routing information in a flexible routing network for a Network on a Chip (NoC) architecture which connects disparate initiators and targets, the method comprising:
implementing a packetization logic at an interface between an initiator or a target and a routing network to receive a first transmission traffic from the initiator or the target and to packetize the first transmission traffic into packets, the routing network including multiple routers to enable the first transmitting traffic from the initiators to the targets for request networks and from the targets to the initiators for response networks, wherein each packet includes a header portion and a body portion, wherein each of the header portion and the body portion includes one or more standard sized transmission units, each standard sized transmission unit having a control section and a payload section, wherein a payload section associated with the body portion includes one or more chunks; and
encoding the one or more chunks using a common data format (CDF), the CDF including a first mandatory field and multiple optional fields, wherein the first mandatory field is aligned with a first set of least significant bits (LSB) of the chunk, wherein the multiple optional fields are arranged according to frequency of use with a most frequently used optional field placed immediately next to and starting at a higher significant bit position from the first mandatory field and a least frequently used optional field placed furthest away from the first mandatory field, wherein an optional field is not transmitted in the routing network when the optional field is not required by an initiator or a target associated with an identified set of connected initiator agents (IAs) and target agents (TAs), wherein when a first optional field is present in the chunk, all optional fields more frequently used than the first optional field are also present in the chunk, and wherein all transmissions within the routing network are based on the CDF.

13. The method of claim 12, wherein, for a response network, the chunk further includes a second mandatory field to indicate that the chunk is associated with the response network, the second mandatory field is aligned with a second set of LSBs of the chunk with the first set of LSBs occupying higher significant bit positions than the second set of LSBs, and wherein a width of the first mandatory field is defined based on a base data word for the identified set of connected IAs and TAs, and wherein a CDF associated with the request network is derived differently from a CDF associated with the response network.

14. The method of claim 13, wherein the standard sized transmission unit is a flit, wherein the header portion of the packet includes one or more header flits, and wherein the body portion of the packet includes one or more body flits, wherein the control section of the standard sized transmission unit includes a type to indicate whether the standard sized transmission unit is a head, a body, a head followed by another head, a head followed by a body, or a head and also a tail, or a body and also a tail.

15. The method of claim 14, wherein each body flit includes one or more chunk payloads each having a chunk payload width which is equal to the width of the first mandatory field together with (1) widths of the present optional fields, (2) a width of the second mandatory field for the response network, and (3) a width of a chunk padding when necessary, wherein each header flit includes one or more chunk payloads each having the chunk payload width which is equal to a width of a header chunk together with a width of a header padding when necessary, wherein the header chunk includes (1) header data and (2) header control when the header chunk is a first header chunk of the one or more header flits.

16. The method of claim 15, wherein each of the multiple routers in the routing network is associated with a link width conversion ratio indicating a width of the router relative to a width of the base data word for the identified set of connected IAs or TAs, and wherein the CDF facilitates narrow-to-wide and wide-to-narrow link width conversion without having to manipulate subparts of data fields in the first transmission traffic.

17. The method of claim 16, wherein a width of the payload section of the standard sized transmission unit at the router is determined based on the link width conversion ratio associated with the router and based on the chunk payload width, and wherein the CDF facilitates the narrow-to-wide and wide-to-narrow link width conversion.

18. The method of claim 17, wherein the narrow-to-wide link width conversion is facilitated by placing two or more chunks adjacent to each other, and wherein the wide-to-narrow link width conversion is facilitated by separating a wide chunk into two or more narrower chunks.

19. The method of claim 12, further comprising:
implementing depacketization logic at the interface between the initiator or the target and the routing network to receive the packets having the chunks formatted according to the CDF and to decode the chunks into a second transmission traffic associated with the targets for the request networks or associated with the initiators for the response networks.

20. A non-transitory computer readable storage medium containing instructions, which, when executed by a machine, cause the machine to generate a software representation of the apparatus of claim 1.

* * * * *